(12) United States Patent
Gao

(10) Patent No.: US 11,898,419 B2
(45) Date of Patent: Feb. 13, 2024

(54) ARTIFICIAL INTELLIGENCE ASSISTED PRODUCTION ADVISORY SYSTEM AND METHOD

(71) Applicant: Schlumberger Technology Corporation, Sugar Land, TX (US)

(72) Inventor: Chao Gao, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 628 days.

(21) Appl. No.: 17/250,052

(22) PCT Filed: May 14, 2019

(86) PCT No.: PCT/US2019/032089
§ 371 (c)(1),
(2) Date: Nov. 13, 2020

(87) PCT Pub. No.: WO2019/222129
PCT Pub. Date: Nov. 21, 2019

(65) Prior Publication Data
US 2021/0222552 A1     Jul. 22, 2021

Related U.S. Application Data

(60) Provisional application No. 62/671,129, filed on May 14, 2018.

(51) Int. Cl.
*E21B 41/00*     (2006.01)
*G06N 20/00*     (2019.01)
(Continued)

(52) U.S. Cl.
CPC ............ *E21B 41/00* (2013.01); *E21B 47/006* (2020.05); *E21B 49/02* (2013.01); *G01V 1/50* (2013.01); *G06N 20/00* (2019.01)

(58) Field of Classification Search
CPC ........ E21B 41/00; E21B 47/006; E21B 49/02; G06N 20/00; G01V 1/50
(Continued)

(56) References Cited

U.S. PATENT DOCUMENTS 8,818,777 B2     8/2014 Howell et al.
10,062,044 B2 *  8/2018 Hildebrand ............... E21B 7/04
(Continued)

FOREIGN PATENT DOCUMENTS

CN     105473812 A  *  4/2016  ............. E21B 44/00
CN     107958104 A  *  4/2018
WO    2018063229 A1     4/2018

OTHER PUBLICATIONS

AAPG_Wiki_2017 (http://web.archive.org/web/20170821123543/http://archives.datapages.com/data/alt-browse/aapg-special-volumes/me10.htm) (Year: 2017).*

(Continued)

*Primary Examiner* — Brian S Cook
(74) *Attorney, Agent, or Firm* — Jeffrey D. Frantz

(57) ABSTRACT

A method includes receiving first data and building a first model of a well based at least partially upon the first data. The method also includes receiving second data and building a second model including a network of flowlines based at least partially upon the second data. At least one of the flowlines is connected to the well. The method also includes combining the first model and the second model to produce a combined model. The method also includes calibrating the combined model to produce a calibrated model. Calibrating the combined model includes receiving measured data, miming a simulation of the combined model to produce simulated results, and adjusting a calibration parameter to cause the simulated results to match the measured data. The calibration parameter includes a productivity index of a fluid (Continued)

flowing out of the well. The method also includes updating the calibrated model to produce an updated model.

20 Claims, 28 Drawing Sheets

(51) Int. Cl.
    *E21B 47/00*     (2012.01)
    *E21B 49/02*     (2006.01)
    *G01V 1/50*     (2006.01)

(58) Field of Classification Search
    USPC .......................................................... 703/10
    See application file for complete search history.

(56) References Cited

U.S. PATENT DOCUMENTS

| | | | |
|---|---|---|---|
| 2007/0112547 A1 | 5/2007 | Ghorayeb et al. | |
| 2012/0095733 A1 | 4/2012 | Rossi | |
| 2012/0330634 A1* | 12/2012 | Amudo | E21B 43/00 703/10 |
| 2013/0035920 A1* | 2/2013 | Al-Shammari | E21B 43/12 703/10 |
| 2014/0180658 A1 | 6/2014 | Rossi et al. | |
| 2015/0339411 A1* | 11/2015 | Raphael | G06Q 10/04 703/1 |
| 2016/0154907 A1 | 6/2016 | Halabe et al. | |
| 2017/0306750 A1 | 10/2017 | Carpenter et al. | |
| 2018/0023373 A1 | 1/2018 | Calvert et al. | |

OTHER PUBLICATIONS

Rehan_2016 (Determination of wax context in crude oil, Jun. 2016 Petroleum Science and Technology 34(9):799-804). (Year: 2016).*
Choke_2011 (GoHaynesvilleShale.com, What is the "ckoke" and how does it effect production rates?, 2011). (Year: 2011).*
Khaled_2017 Evaluation of continuous gas lift systems in an oil well, International journal of petroleum and petrochemical engineering (IJPPE), vol. 3, Issue 3, 2017 pp. 66-75 (Year: 2017).*
Xiang Ma, et al., "Real-Time Production Surveillance and Optimization at a Mature Subsea Asset", SPE-181103-MS, presented at the SPE Intelligent Energy International Conference and Exhibition, Aberdeen United Kingdom, 2016, 16 pages.
International Preliminary Report on Patentability of International Patent Application No. PCT/US2019/032089 dated Nov. 17, 2020, 5 pages.
Search Report and Written Opinion of International Patent Application No. PCT/US2019/032089 dated Jul. 22, 2019, 8 pages.
Johnsrud et al., "Improved Operation of Subsea Boosting Systems through Advanced Condition Monitoring and Data Analytics," presentation at the Offshore Technology Conference held in Houston, Texas, USA, Apr. 30-May 3, 2018, 10 pages.
Jimenez and Zornio, "Leveraging Field Intelligence through Operational Certainty: How Automated Operating Practices Deliver Industry Leading Results," presentation at the Offshore Technology Conference held in Houston, Texas, USA Apr. 30-May 3, 2018, 5 pages.
Tang et al., "Building Cloud Services for Monitoring Offshore Equipment and Operators," presentation at the Offshore Technology Conference held in Houston, Texas, USA, Apr. 30-May 3, 2018, 13 pages.

* cited by examiner

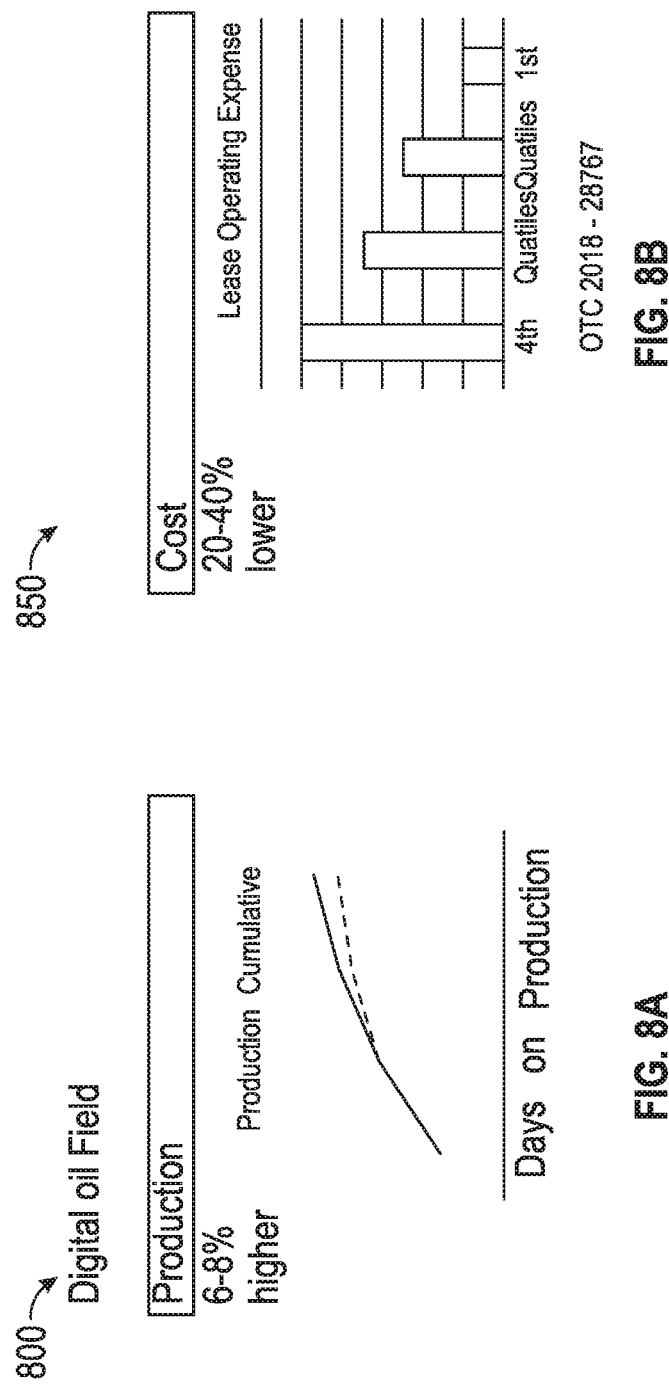

Making Effective Use of Data and Current Technology Brings Significant Value
Model automation
Automated model construction, calibration, real-time update
AI assisted advisory system
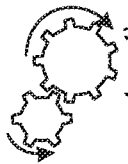
Integrated knowledge into single source of the truth for well insights integrity
Reduce the well downtime by: Proactive service instead of reactive
FIG. 23

ARTIFICIAL INTELLIGENCE ASSISTED PRODUCTION ADVISORY SYSTEM AND METHOD

CROSS-REFERENCE TO RELATED APPLICATIONS

This application is a National Stage of International Application No. PCT/US2019/032089, filed on May 14, 2019, which claims priority to U.S. Provisional Patent Application No. 62/671,129, filed on May 14, 2018, the entirety of which is incorporated herein by reference.

BACKGROUND

Machine learning using artificial intelligence (AI) is used to provide digital oil field (DOF) solutions. Real-time data from different smart devices may be used to investigate equipment problems, to improve the design, and to predict failures. However, those AI solutions may be based on data pattern recognition, which reacts to failures that have already occurred. Therefore, it would be desirable to have systems and methods that are proactive and predict failures before they occur so that they may be prevented.

SUMMARY

A method includes receiving first data and building a first model of a well based at least partially upon the first data. The method also includes receiving second data and building a second model including a network of flowlines based at least partially upon the second data. At least one of the flowlines is connected to the well. The method also includes combining the first model and the second model to produce a combined model. The method also includes calibrating the combined model to produce a calibrated model. Calibrating the combined model includes receiving measured data, running a simulation of the combined model to produce simulated results, and adjusting a calibration parameter to cause the simulated results to match the measured data. The calibration parameter includes a productivity index of a fluid flowing out of the well. The method also includes updating the calibrated model to produce an updated model.

A non-transitory computer-readable medium is also disclosed. The medium stores instructions that, when executed by at least one processor of a computing system, cause the computing system to perform operations. The operations include receiving first data and building a first model of a well based at least partially upon the first data. The first data is not real-time data. The operations also include receiving second data and building a second model including a network of flowlines based at least partially upon the second data. At least one of the flowlines is connected to the well. The operations also include combining the first model and the second model to produce a combined model. The operations also include calibrating the combined model to produce a calibrated model. The operations also include updating the calibrated model to produce an updated model. The operations also include receiving real-time data and building a machine-learning (ML) model based at least partially upon the real-time data and the updated model.

A computing system is also disclosed. The computing system includes one or more processors and a memory system. The memory system includes one or more non-transitory computer-readable media storing instructions that, when executed by at least one of the one or more processors, cause the computing system to perform operations. The operations include receiving first data and building a first model of a well based at least partially upon the first data. The operations also include receiving second data and building a second model including a network of flowlines based at least partially upon the second data. The operations also include combining the first model and the second model to produce a combined model. The operations also include calibrating the combined model to produce a calibrated model. The operations also include updating the calibrated model to produce an updated model. The operations also include receiving real-time data and building a machine-learning (ML) model based at least partially upon the real-time data and the updated model. The operations also include detecting a first problem using the ML model. The first problem is based at least partially upon the real-time data. The operations also include detecting a second problem using the ML model. The second problem is based at least partially upon the updated model. The operations also include detecting a third problem using the ML model. The third problem is based at least partially upon a pre-defined rule. The operations also include ranking the first problem, the second problem, and the third problem using the ML model. The operations also include identifying a highest-ranking one of the first problem, the second problem, and the third problem. The operations also include determining an adjustment to an operating parameter to address the highest-ranking one of the first problem, the second problem, and the third problem.

It will be appreciated that this summary is intended merely to introduce some aspects of the present methods, systems, and media, which are more fully described and/or claimed below. Accordingly, this summary is not intended to be limiting.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 8A illustrates a graph showing production in a digital oil field (DOF), and FIG. 8B illustrates a graph showing cost in a DOF, according to an embodiment.

FIG. 23 illustrates a schematic view of a way to make effective use of data and technology, according to an embodiment.

DESCRIPTION OF EMBODIMENTS

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the invention. The first object and the second object are both objects, respectively, but they are not to be considered the same object.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques and workflows that are in accordance with some embodiments. Some operations in the processing procedures, methods, techniques and workflows disclosed herein may be combined and/or the order of some operations may be changed.

Figure 1A:
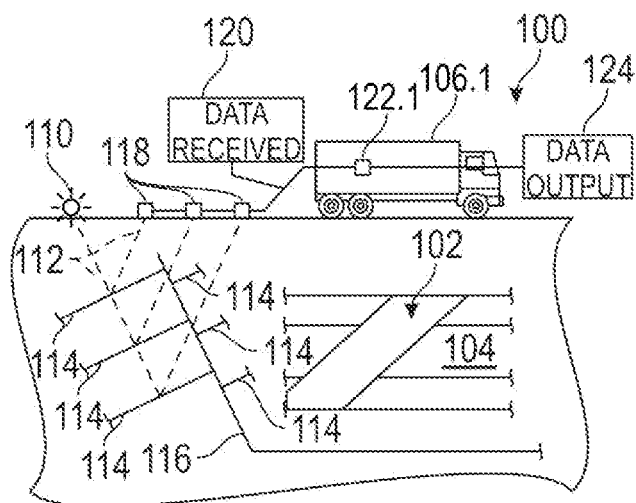
FIGS. 1A, 1B, 1C, 1D, 2, 3A, and 3B illustrate simplified, schematic views of an oilfield and its operation, according to an embodiment.

FIGS. 1A-1D illustrate simplified, schematic views of oilfield 100 having subterranean formation 102 containing reservoir 104 therein in accordance with implementations of various technologies and techniques described herein. FIG. 1A illustrates a survey operation being performed by a survey tool, such as seismic truck 106.1, to measure properties of the subterranean formation. The survey operation is a seismic survey operation for producing sound vibrations. In FIG. 1A, one such sound vibration, e.g., sound vibration 112 generated by source 110, reflects off horizons 114 in earth formation 116. A set of sound vibrations is received by sensors, such as geophone-receivers 118, situated on the earth's surface. The data received 120 is provided as input data to a computer 122.1 of a seismic truck 106.1, and responsive to the input data, computer 122.1 generates seismic data output 124. This seismic data output may be stored, transmitted or further processed as desired, for example, by data reduction.

Figure 1B:
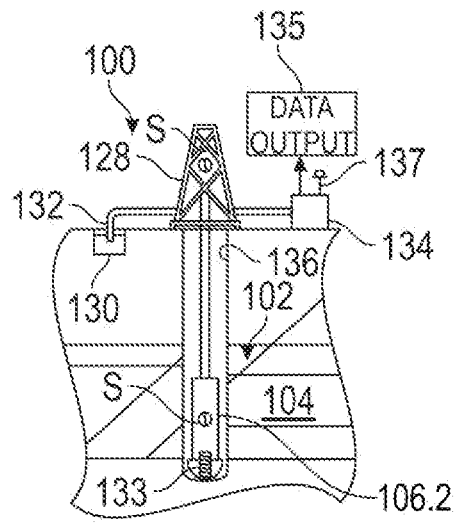

FIG. 1B illustrates a drilling operation being performed by drilling tools 106.2 suspended by rig 128 and advanced into subterranean formations 102 to form wellbore 136. Mud pit 130 is used to draw drilling mud into the drilling tools via flow line 132 for circulating drilling mud down through the drilling tools, then up wellbore 136 and back to the surface. The drilling mud is typically filtered and returned to the mud pit. A circulating system may be used for storing, controlling, or filtering the flowing drilling mud. The drilling tools are advanced into subterranean formations 102 to reach reservoir 104. Each well may target one or more reservoirs. The drilling tools are adapted for measuring downhole properties using logging while drilling tools. The logging while drilling tools may also be adapted for taking core sample 133 as shown.

Computer facilities may be positioned at various locations about the oilfield 100 (e.g., the surface unit 134) and/or at remote locations. Surface unit 134 may be used to communicate with the drilling tools and/or offsite operations, as well as with other surface or downhole sensors. Surface unit 134 is capable of communicating with the drilling tools to send commands to the drilling tools, and to receive data therefrom. Surface unit 134 may also collect data generated during the drilling operation and produce data output 135, which may then be stored or transmitted.

Sensors (S), such as gauges, may be positioned about oilfield 100 to collect data relating to various oilfield operations as described previously. As shown, sensor (S) is positioned in one or more locations in the drilling tools and/or at rig 128 to measure drilling parameters, such as weight on bit, torque on bit, pressures, temperatures, flow rates, compositions, rotary speed, and/or other parameters of the field operation. Sensors (S) may also be positioned in one or more locations in the circulating system.

Drilling tools 106.2 may include a bottom hole assembly (BHA) (not shown), generally referenced, near the drill bit (e.g., within several drill collar lengths from the drill bit). The bottom hole assembly includes capabilities for measuring, processing, and storing information, as well as communicating with surface unit 134. The bottom hole assembly further includes drill collars for performing various other measurement functions.

The bottom hole assembly may include a communication subassembly that communicates with surface unit 134. The communication subassembly is adapted to send signals to and receive signals from the surface using a communications channel such as mud pulse telemetry, electro-magnetic telemetry, or wired drill pipe communications. The communication subassembly may include, for example, a transmitter that generates a signal, such as an acoustic or electromagnetic signal, which is representative of the measured drilling parameters. It will be appreciated by one of skill in the art that a variety of telemetry systems may be employed, such as wired drill pipe, electromagnetic or other known telemetry systems.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

The data gathered by sensors (S) may be collected by surface unit 134 and/or other data collection sources for analysis or other processing. The data collected by sensors (S) may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Surface unit 134 may include transceiver 137 to allow communications between surface unit 134 and various portions of the oilfield 100 or other locations. Surface unit 134 may also be provided with or functionally connected to one or more controllers (not shown) for actuating mechanisms at oilfield 100. Surface unit 134 may then send command signals to oilfield 100 in response to data received. Surface unit 134 may receive commands via transceiver 137 or may itself execute commands to the controller. A processor may be provided to analyze the data (locally or remotely), make the decisions and/or actuate the controller. In this manner, oilfield 100 may be selectively adjusted based on the data collected. This technique may be used to optimize (or improve) portions of the field operation, such as controlling drilling, weight on bit, pump rates, or other parameters. These adjustments may be made automatically based on computer protocol, and/or manually by an operator. In some cases, well plans may be adjusted to select optimum (or improved) operating conditions, or to avoid problems.

Figure 1C:
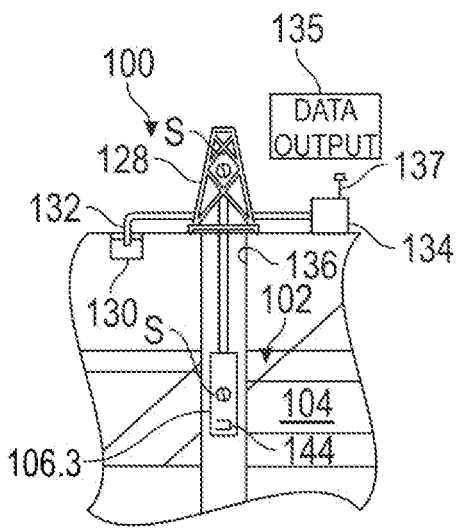

FIG. 1C illustrates a wireline operation being performed by wireline tool 106.3 suspended by rig 128 and into wellbore 136 of FIG. 1B. Wireline tool 106.3 is adapted for deployment into wellbore 136 for generating well logs, performing downhole tests and/or collecting samples. Wireline tool 106.3 may be used to provide another method and apparatus for performing a seismic survey operation. Wireline tool 106.3 may, for example, have an explosive, radioactive, electrical, or acoustic energy source 144 that sends and/or receives electrical signals to surrounding subterranean formations 102 and fluids therein.

Wireline tool 106.3 may be operatively connected to, for example, geophones 118 and a computer 122.1 of a seismic truck 106.1 of FIG. 1A. Wireline tool 106.3 may also provide data to surface unit 134. Surface unit 134 may collect data generated during the wireline operation and may produce data output 135 that may be stored or transmitted. Wireline tool 106.3 may be positioned at various depths in the wellbore 136 to provide a survey or other information relating to the subterranean formation 102.

Sensors (S), such as gauges, may be positioned about oilfield 100 to collect data relating to various field operations as described previously. As shown, sensor S is positioned in wireline tool 106.3 to measure downhole parameters which relate to, for example porosity, permeability, fluid composition and/or other parameters of the field operation.

Figure 1D:
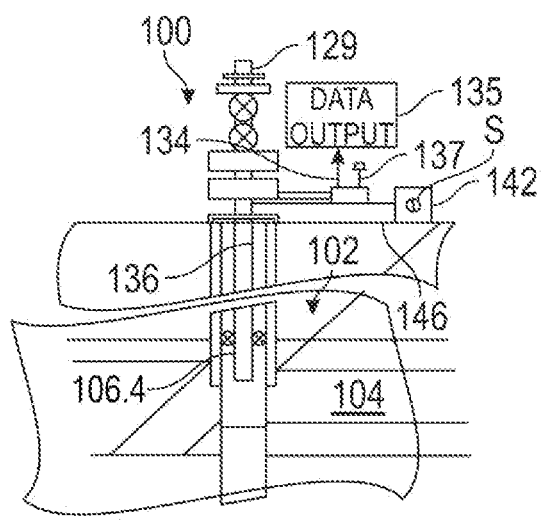

FIG. 1D illustrates a production operation being performed by production tool 106.4 deployed from a production unit or Christmas tree 129 and into completed wellbore 136 for drawing fluid from the downhole reservoirs into surface facilities 142. The fluid flows from reservoir 104 through perforations in the casing (not shown) and into production tool 106.4 in wellbore 136 and to surface facilities 142 via gathering network 146.

Sensors (S), such as gauges, may be positioned about oilfield 100 to collect data relating to various field operations as described previously. As shown, the sensor (S) may be positioned in production tool 106.4 or associated equipment, such as Christmas tree 129, gathering network 146, surface facility 142, and/or the production facility, to measure fluid parameters, such as fluid composition, flow rates, pressures, temperatures, and/or other parameters of the production operation.

Production may also include injection wells for added recovery. One or more gathering facilities may be operatively connected to one or more of the wellsites for selectively collecting downhole fluids from the wellsite(s).

While FIGS. 1B-1D illustrate tools used to measure properties of an oilfield, it will be appreciated that the tools may be used in connection with non-oilfield operations, such as gas fields, mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The field configurations of FIGS. 1A-1D are intended to provide a brief description of an example of a field usable with oilfield application frameworks. Part of, or the entirety, of oilfield 100 may be on land, water and/or sea. Also, while a single field measured at a single location is depicted, oilfield applications may be utilized with any combination of one or more oilfields, one or more processing facilities and one or more wellsites.

Figure 2:
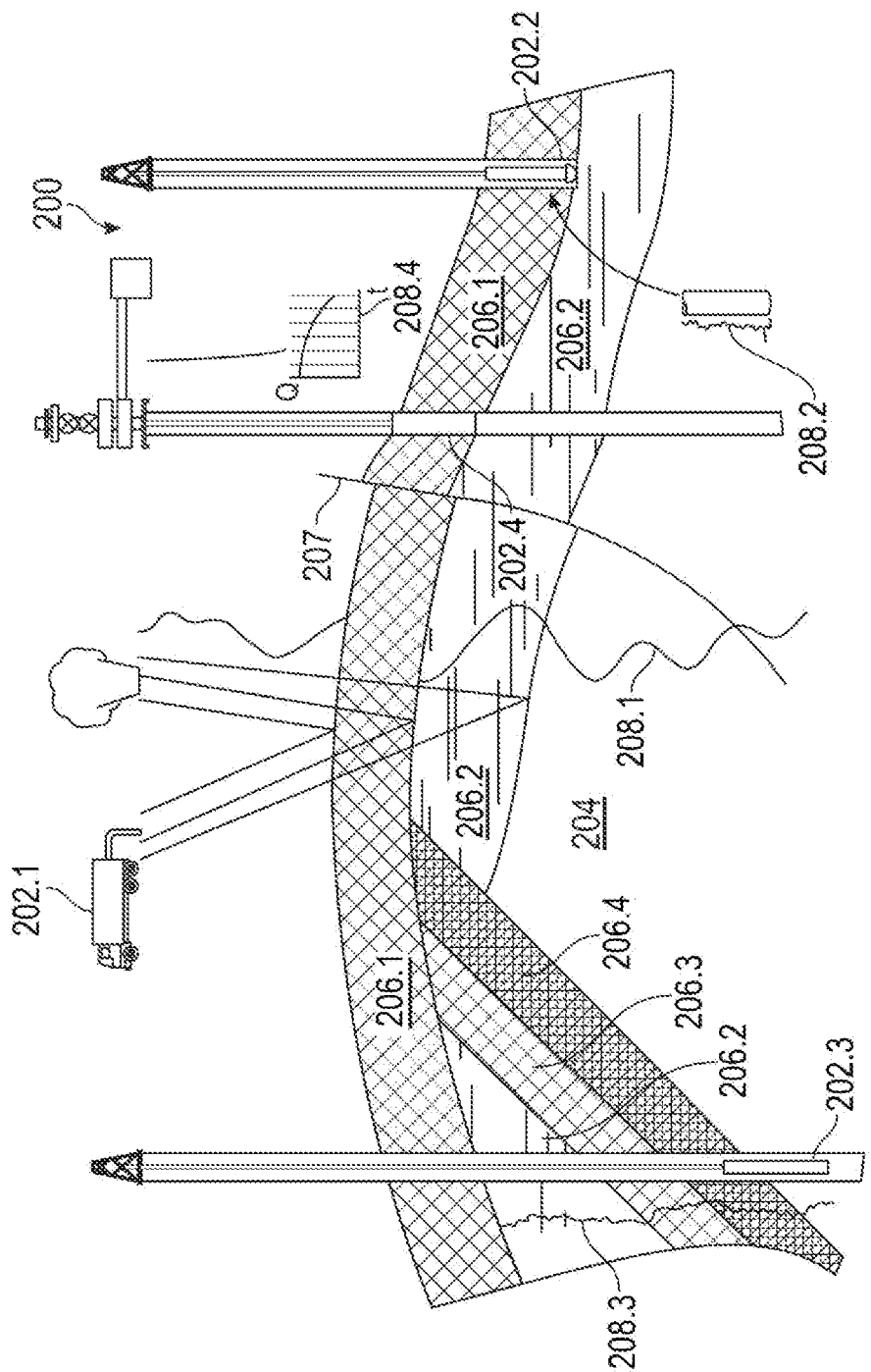

FIG. 2 illustrates a schematic view, partially in cross section of oilfield 200 having data acquisition tools 202.1, 202.2, 202.3 and 202.4 positioned at various locations along oilfield 200 for collecting data of subterranean formation 204 in accordance with implementations of various technologies and techniques described herein. Data acquisition tools 202.1-202.4 may be the same as data acquisition tools 106.1-106.4 of FIGS. 1A-1D, respectively, or others not depicted. As shown, data acquisition tools 202.1-202.4 generate data plots or measurements 208.1-208.4, respectively. These data plots are depicted along oilfield 200 to demonstrate the data generated by the various operations.

Data plots 208.1-208.3 are examples of static data plots that may be generated by data acquisition tools 202.1-202.3, respectively; however, it should be understood that data plots 208.1-208.3 may also be data plots that are updated in real time. These measurements may be analyzed to better define the properties of the formation(s) and/or determine the accuracy of the measurements and/or for checking for errors. The plots of each of the respective measurements may be aligned and scaled for comparison and verification of the properties.

Static data plot 208.1 is a seismic two-way response over a period of time. Static plot 208.2 is core sample data measured from a core sample of the formation 204. The core sample may be used to provide data, such as a graph of the density, porosity, permeability, or some other physical property of the core sample over the length of the core. Tests for density and viscosity may be performed on the fluids in the core at varying pressures and temperatures. Static data plot 208.3 is a logging trace that typically provides a resistivity or other measurement of the formation at various depths.

A production decline curve or graph 208.4 is a dynamic data plot of the fluid flow rate over time. The production decline curve typically provides the production rate as a function of time. As the fluid flows through the wellbore, measurements are taken of fluid properties, such as flow rates, pressures, composition, etc.

Other data may also be collected, such as historical data, user inputs, economic information, and/or other measurement data and other parameters of interest. As described below, the static and dynamic measurements may be analyzed and used to generate models of the subterranean formation to determine characteristics thereof. Similar measurements may also be used to measure changes in formation aspects over time.

The subterranean structure 204 has a plurality of geological formations 206.1-206.4. As shown, this structure has several formations or layers, including a shale layer 206.1, a carbonate layer 206.2, a shale layer 206.3 and a sand layer 206.4. A fault 207 extends through the shale layer 206.1 and the carbonate layer 206.2. The static data acquisition tools are adapted to take measurements and detect characteristics of the formations.

While a specific subterranean formation with specific geological structures is depicted, it will be appreciated that oilfield 200 may contain a variety of geological structures and/or formations, sometimes having extreme complexity. In some locations, typically below the water line, fluid may occupy pore spaces of the formations. Each of the measurement devices may be used to measure properties of the formations and/or its geological features. While each acquisition tool is shown as being in specific locations in oilfield 200, it will be appreciated that one or more types of measurement may be taken at one or more locations across one or more fields or other locations for comparison and/or analysis.

The data collected from various sources, such as the data acquisition tools of FIG. 2, may then be processed and/or evaluated. Typically, seismic data displayed in static data plot 208.1 from data acquisition tool 202.1 is used by a geophysicist to determine characteristics of the subterranean formations and features. The core data shown in static plot 208.2 and/or log data from well log 208.3 are typically used by a geologist to determine various characteristics of the subterranean formation. The production data from graph 208.4 is typically used by the reservoir engineer to determine fluid flow reservoir characteristics. The data analyzed by the geologist, geophysicist and the reservoir engineer may be analyzed using modeling techniques.

Figure 3A:
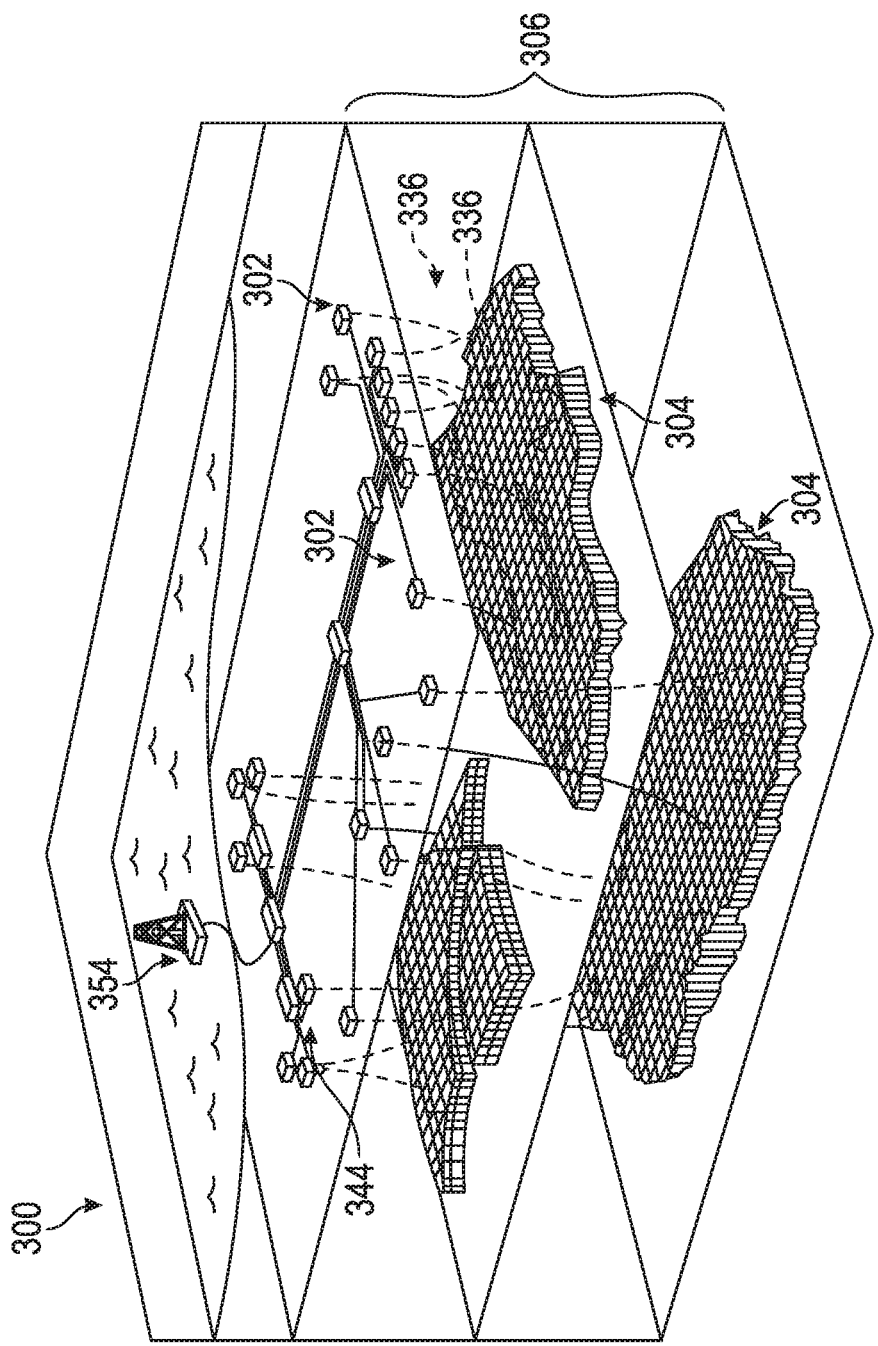

FIG. 3A illustrates an oilfield 300 for performing production operations in accordance with implementations of various technologies and techniques described herein. As shown, the oilfield has a plurality of wellsites 302 operatively connected to central processing facility 354. The oilfield configuration of FIG. 3A is not intended to limit the scope of the oilfield application system. Part, or all, of the oilfield may be on land and/or sea. Also, while a single oilfield with a single processing facility and a plurality of wellsites is depicted, any combination of one or more oilfields, one or more processing facilities and one or more wellsites may be present.

Each wellsite 302 has equipment that forms wellbore 336 into the earth. The wellbores extend through subterranean formations 306 including reservoirs 304. These reservoirs 304 contain fluids, such as hydrocarbons. The wellsites draw fluid from the reservoirs and pass them to the processing facilities via surface networks 344. The surface networks 344 have tubing and control mechanisms for controlling the flow of fluids from the wellsite to processing facility 354.

Figure 3B:
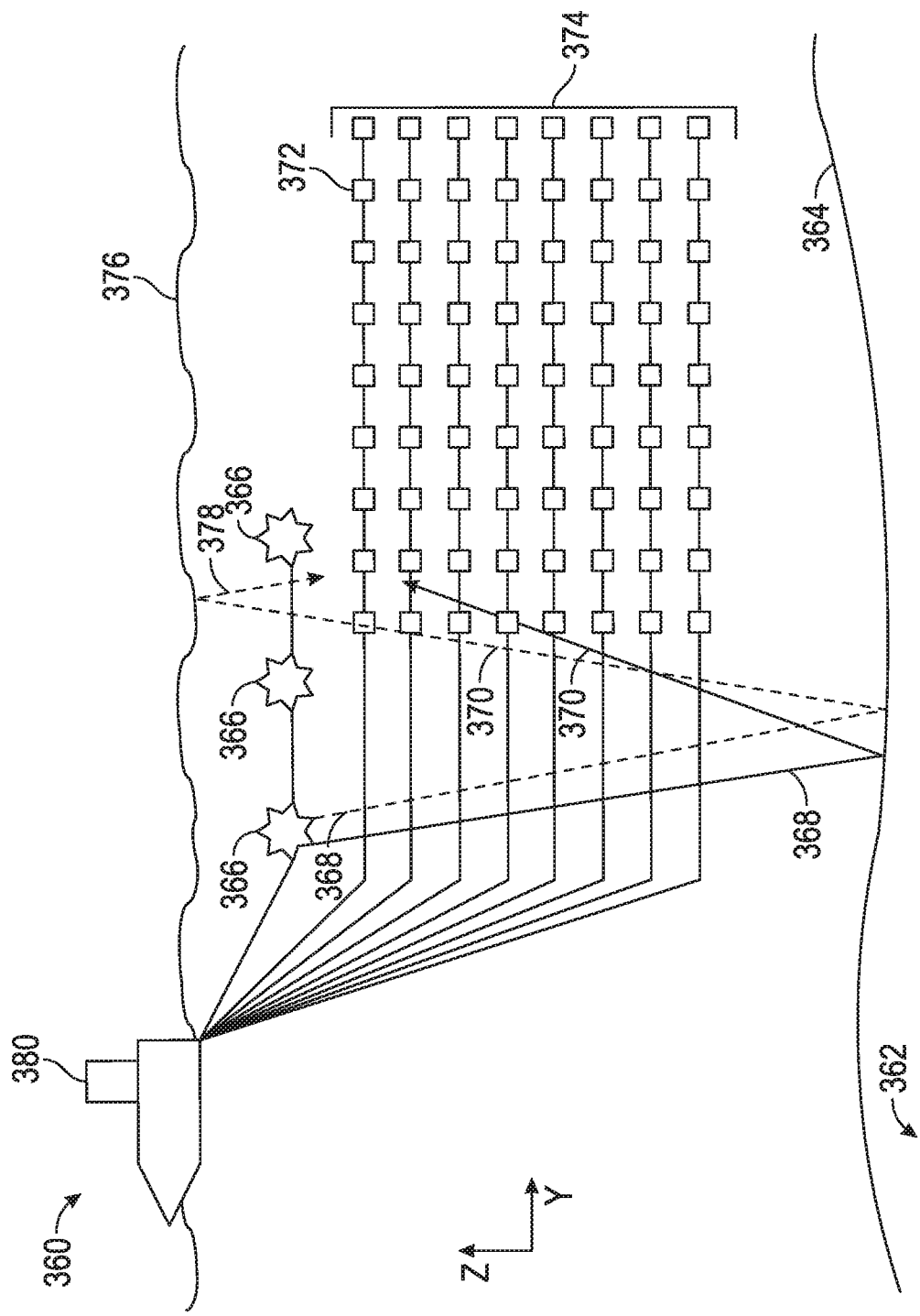

Attention is now directed to FIG. 3B, which illustrates a side view of a marine-based survey 360 of a subterranean subsurface 362 in accordance with one or more implementations of various techniques described herein. Subsurface 362 includes seafloor surface 364. Seismic sources 366 may include marine sources such as vibroseis or airguns, which may propagate seismic waves 368 (e.g., energy signals) into the Earth over an extended period of time or at a nearly instantaneous energy provided by impulsive sources. The seismic waves may be propagated by marine sources as a frequency sweep signal. For example, marine sources of the vibroseis type may initially emit a seismic wave at a low frequency (e.g., 5 Hz) and increase the seismic wave to a high frequency (e.g., 80-90 Hz) over time.

The component(s) of the seismic waves 368 may be reflected and converted by seafloor surface 364 (i.e., reflector), and seismic wave reflections 370 may be received by a plurality of seismic receivers 372. Seismic receivers 372 may be disposed on a plurality of streamers (i.e., streamer array 374). The seismic receivers 372 may generate electrical signals representative of the received seismic wave reflections 370. The electrical signals may be embedded with information regarding the subsurface 362 and captured as a record of seismic data.

In one implementation, each streamer may include streamer steering devices such as a bird, a deflector, a tail buoy and the like, which are not illustrated in this application. The streamer steering devices may be used to control the position of the streamers in accordance with the techniques described herein.

In one implementation, seismic wave reflections 370 may travel upward and reach the water/air interface at the water surface 376, a portion of reflections 370 may then reflect downward again (i.e., sea-surface ghost waves 378) and be received by the plurality of seismic receivers 372. The sea-surface ghost waves 378 may be referred to as surface multiples. The point on the water surface 376 at which the wave is reflected downward is generally referred to as the downward reflection point.

The electrical signals may be transmitted to a vessel 380 via transmission cables, wireless communication or the like. The vessel 380 may then transmit the electrical signals to a data processing center. Alternatively, the vessel 380 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 372. In one implementation, the seismic data may be processed to generate a seismic image of the subsurface 362.

Marine seismic acquisition systems tow each streamer in streamer array 374 at the same depth (e.g., 5-10 m). However, marine based survey 360 may tow each streamer in streamer array 374 at different depths such that seismic data may be acquired and processed in a manner that avoids the effects of destructive interference due to sea-surface ghost waves. For instance, marine-based survey 360 of FIG. 3B illustrates eight streamers towed by vessel 380 at eight different depths. The depth of each streamer may be controlled and maintained using the birds disposed on each streamer.

The present disclosure combines physics-based modeling solutions with data-driven machine-learning (ML) techniques to enhance model solutions and at the same time provide predict failures. This may be a proactive method to predict failures before they occur and enable a user to plan for the downtime.

Although different software platforms are described below, it is to be understood that they are merely illustrative and other software platforms may also or instead be used. ProdOps is a production advisory system under DELFI® for improving asset performance in real time. ProdOps provides an overview of the whole asset performance and automatically guides the production engineers, surveillance engineers, field manager, and field engineers to efficiently manage their digital oilfield by focusing on high-value operational tasks. ProdOps brings together a range of standard advisory that detects, predicts, diagnoses problems, and recommends remedial plans in real-time to address well performance and optimize field production.

Once the new data comes into the system from the production data service (PDS), a backend engine may run physics-based simulations or apply customizable rules to provide warnings, diagnostic solutions with uncertainty, and/or perform well rankings based on KPI. Inspection tickets may be created based on well insights, and sent to field engineers to take action. The task management module provides a way to track the tickets, and update information until action has been taken or the problem has been solved. The production data, solution, and ticket histories may be archived and may be retrieved anytime.

Figure 4:
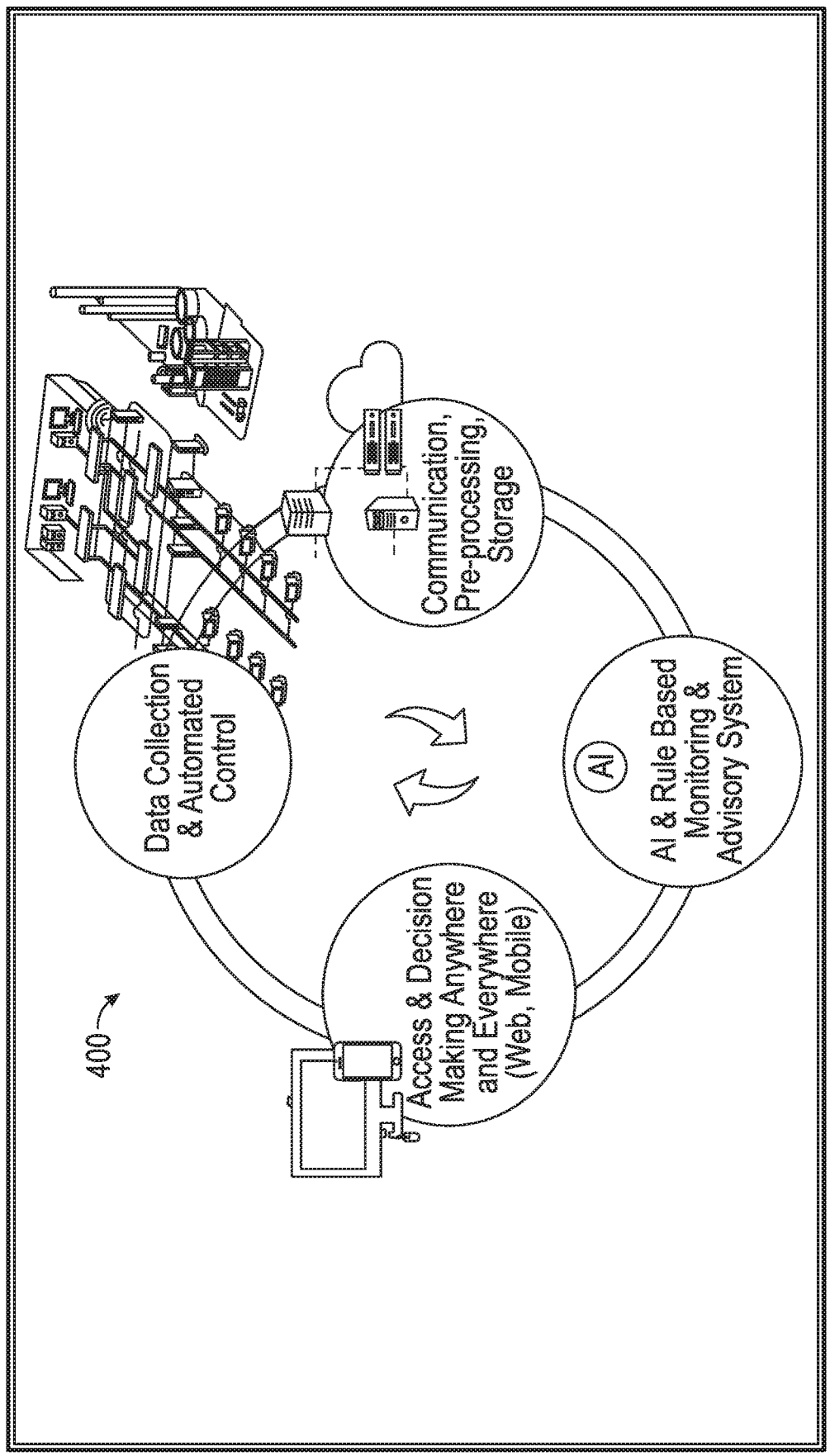
FIG. 4 illustrates a schematic view showing a solution as a closed-loop based on real-time data, according to an embodiment.

FIG. 4 illustrates a schematic view showing a cycle 400 as a closed-loop based on real-time data, according to an embodiment. A current industrial trend desires an end-to-end automation solution in a digital oil field (DOF). Smart devices may be embedded in downhole gauges, wellheads, compressors, and pump stations to provide frequent measurements. Data may be received by a local controller and sent to local server for preprocessing, and then to a private computer center or a public cloud service for further processing. An AI system may be present to provide recommendations based at least partially upon the processed data. Authorized users may be able to access the data from a website or mobile application, anywhere, anytime, make decisions based upon the data, and transmit control commands to execute the decisions.

Smart devices (e.g., sensors) are coupled to or embedded in a wellhead, downhole (e.g., in the wellbore), at a pumping station, on a manifold, and the like to take measurements that are then transmitted to a controller. The measurements may also or instead be transmitted through an edge server to a private computer center or public cloud for further processing and storage. The advisory system is used to provide quick solutions and advice. Authorized users may have access through a website or mobile application to view the production data, receive a warning with a recommended action, and make decisions based upon the data and/or the recommended actions. After the decision is made, an inspection ticket may be sent to the field with the recommendation for execution, and the system receives feedback right away from the production data. The closed-loop solution provides exposure to the field data, the solution, the execution, and the feedback results.

Figure 5:
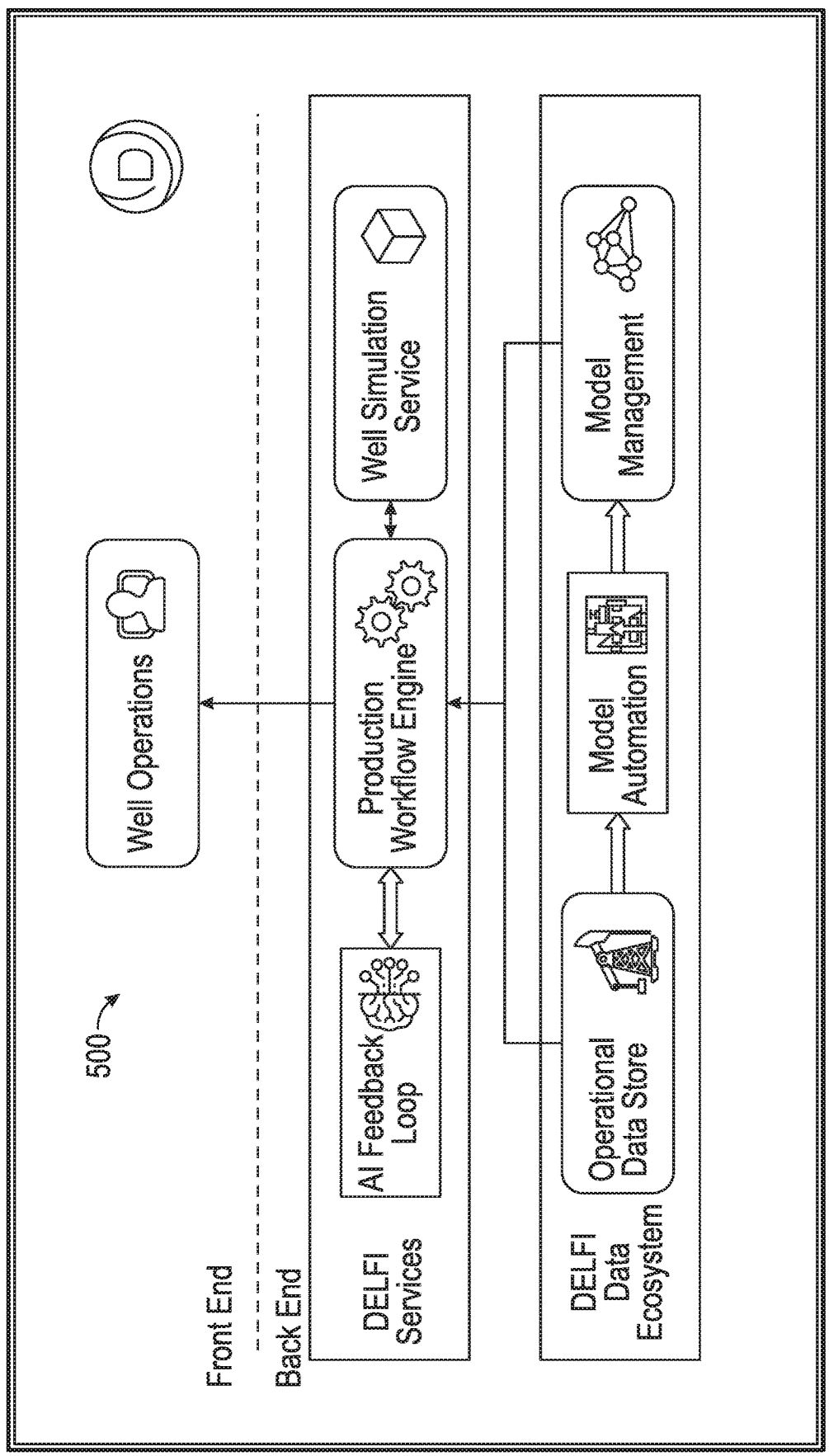
FIG. 5 illustrates a schematic view showing a system architecture of how solutions can be integrated into an existing production operation system, according to an embodiment.

As mentioned above, ProdOps is a native application under the DELFI® ecosystem, and the multiphase fluid flow simulation (PIPESIM®) engine may be used internally to provide a physics-based solution. The environment may be built on the cloud. FIG. 5 illustrates a schematic view showing a system architecture 500 of how solutions can be integrated into the existing production operation system, according to an embodiment. The operational data store connects to different sources of field data (e.g., different servers). The model automation solution generates models with data from the operational data store and feeds the models into a model management module, which manages well and network models for simulation purposes. The simulation service runs physics-based simulations. The production workflow engine then uses both the simulation results and the field data to generate rules-based insights and makes them available to the front end, where a web application is provided to visualize the data and insights. The AI feedback loop utilizes the history of data and insights from the production workflow engine and provides AI-assisted recommendations. These recommendations can again be made available to the front end through the production workflow engine.

An AI-assisted advisory solution is presented herein that combines the physics and data to reach accurate well insights. As a deep learning strategy, a dense neutral network (DNN) may be used in the AI system to train the machine-learning model and to make predictions with the new datasets. Whenever a task is completed and execution results are recorded, the AI system self-adapts through a reinforcement learning process to enhance the model prediction. With this AI-assisted solution, the production advisory system prioritizes the physics-based insights, recognizes extra failures, which are not predictable by current model solutions, and produces reliable, repeatable decisions and results.

There may be too many insights generated from the physics or rule-based solution to process efficiently. As a result, it may be difficult for a field engineer to follow up on each of them on daily basis. In addition, some of the insights may not be true/accurate. Moreover, many equipment failures are not predictable using a physics-based model solution alone, and those failures cause production loss due to well downtime.

To improve the accuracy of rule and model-based insights, an advanced deep learning strategy may be applied to incorporate a physics-based model solution, production data, and feedback on execution tracking, to prioritize insights based on probability.

Figure 6:
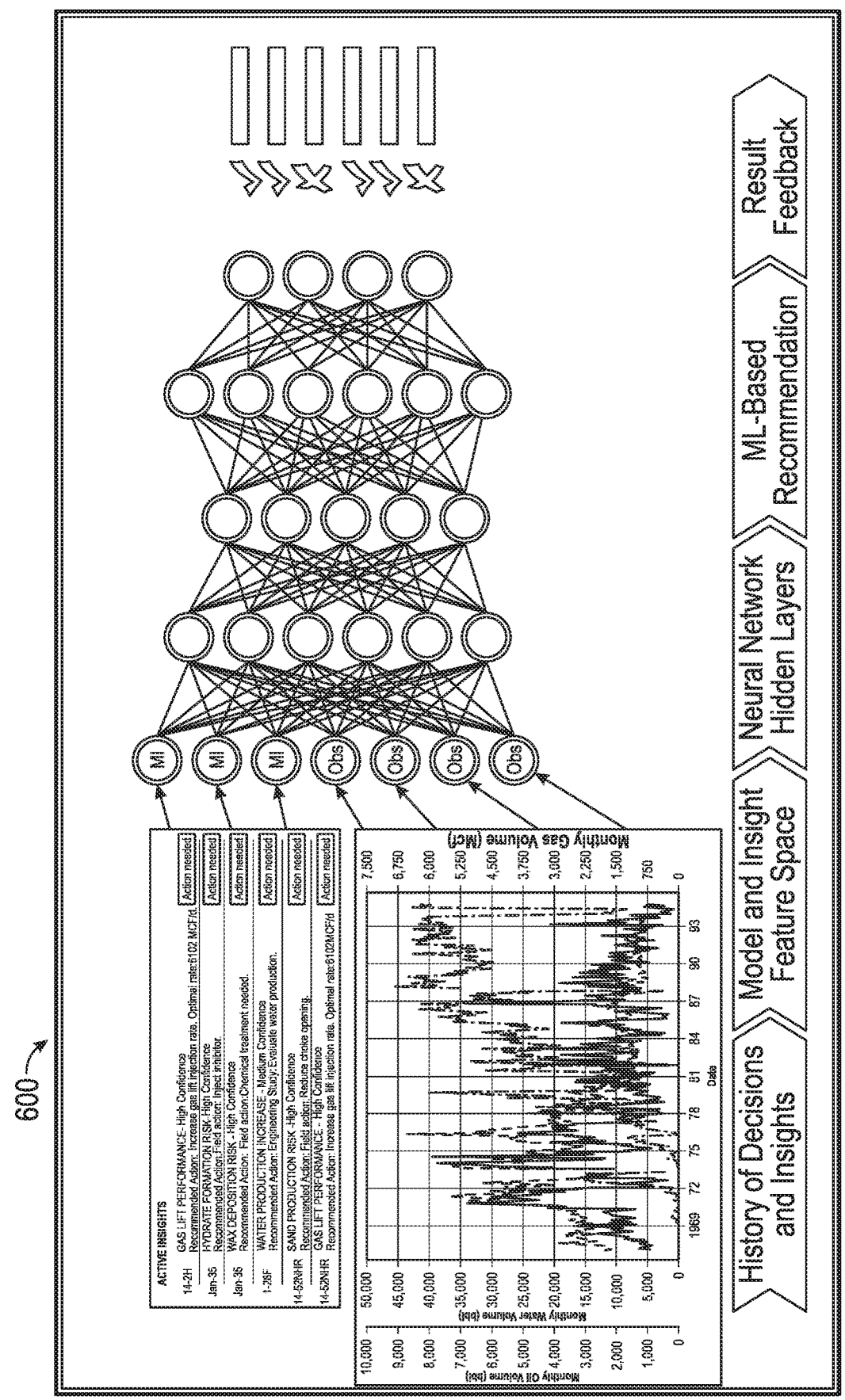
FIG. 6 illustrates a schematic view of an AI-assisted system, according to an embodiment.

FIG. 6 illustrates a schematic view of an AI-assisted system 600, according to an embodiment. The system starts from the history of production data, decisions, and insights. From this data, the system can extract a number of features, which can feed into a machine-learning model, such as a dense neural network. Because well events for a single well can be scarce, the system may introduce a clustering algorithm to group wells which are physically close to each other, produce from the same reservoir layer, or have other similar properties, in the training dataset. The recommendation from the machine-learning model may help production engineers make more informed decisions on issues that are actually happening or likely to happen, and determine, e.g., whether a workover should occur. The decisions and the outcomes can then be published as part of the history, to be learned for the next recommendation.

Figures 7A, 7B:
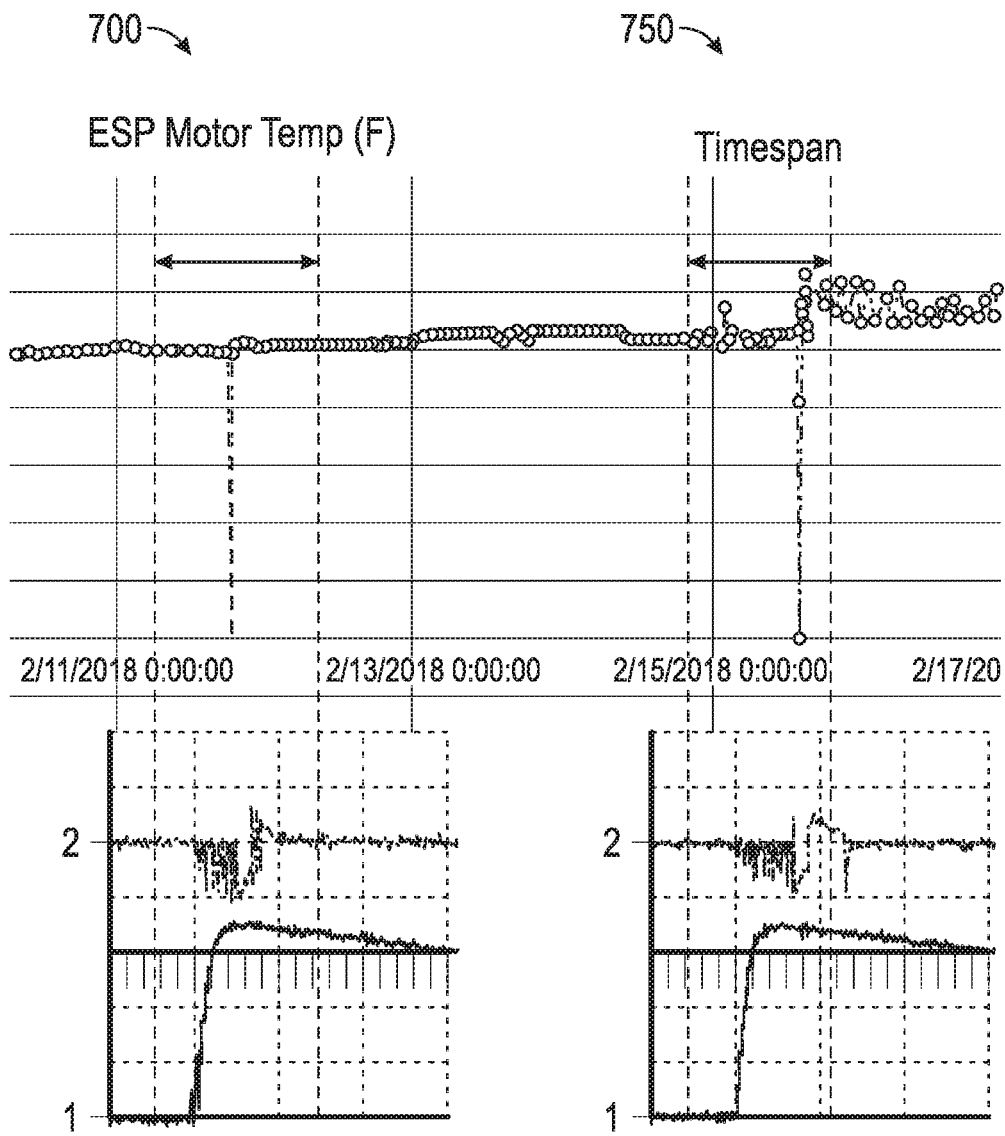
FIGS. 7A and 7B illustrate graphs showing failure pattern recognition for an electric submersible pump (ESP), according to an embodiment.

Many equipment failures are not predictable using solely a physics-based model solution, and such unpredicted equipment failures can lead to loss of production because of well downtime. The failures, such as tubing leakage, casing leakage, pumping module failure, and critical asset failure, may not be predictable using solely a physics-based model solution, and may result in losses of production and revenue, especially in deep sea water scenarios. The prediction of those failures can be addressed by data pattern recognition by considering a time factor. For example, by analyzing the relevant data feature patterns such as electronic submersible pump (ESP) motor temperature, intake pressure, outlet pressure, and motor current amperage (amps) during a failure timespan, the machine may be trained with many normal and failure patterns to detect abnormal behaviors. FIGS. 7A and 7B illustrate graphs 700, 750 showing examples to how, with time-series data, a machine learning model may be able to learn the pattern behaviors for different parameters in a predetermined timespan (e.g., six hours, 12 hours, or 24 hours) to detect and raise alarms when an anomaly occurs and gain the ability to predict the non-productive time events.

This feature may be added to the advisory solution system. Instead of being reactive on the failures, this solution provides ability to be proactive and generate a plan for the failures to reduce the downtime. In short, as more data becomes available, the AI system self-adapts through a reinforcement learning process to weigh model insights, add new failure patterns, and enhance the advisory prediction.

Figure 9:
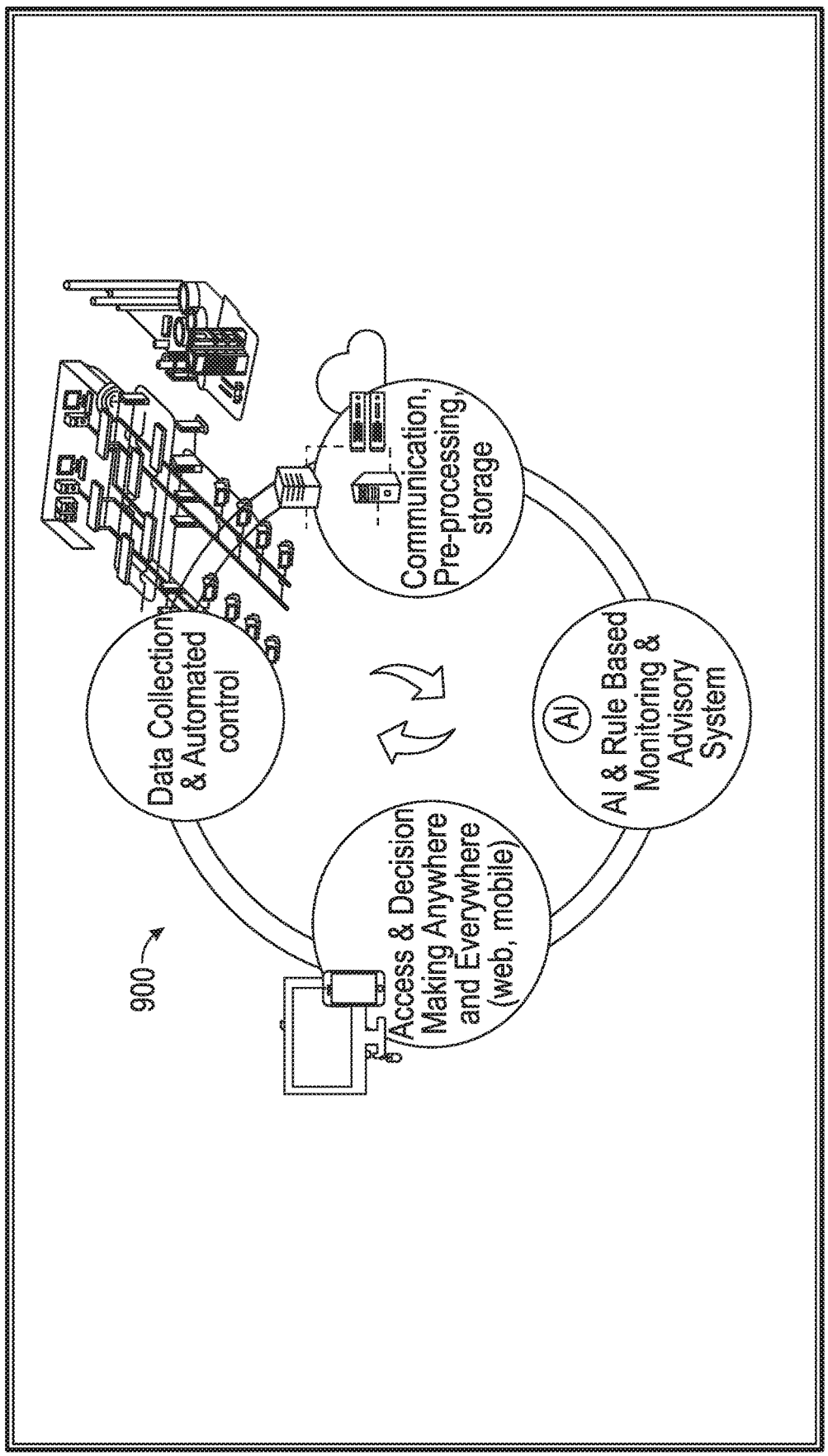
FIG. 9 illustrates a schematic view of digital production optimization and automation, according to an embodiment.

FIG. 8A illustrates a graph 800 showing production in a digital oil field (DOF), and FIG. 8B illustrates a graph 850 showing cost in a DOF, according to an embodiment. FIG. 9 illustrates a schematic view of a cycle 900 of digital production optimization and automation, according to an embodiment. Service providers have built different products to give end-to-end automation solutions in the DOF. For example, smart devices (e.g., sensors) may be embedded in downhole gauges, wellheads, compressors, and/or pump stations to provide frequent measurements. The data is received by a local controller and sent to local server preprocessing, and then to a private computer center or a public cloud service for further processing. An AI system may provide a quick solution and/or advice. Authorized users may be able to access the data from a website or mobile application, anywhere and anytime, make a decision, and control the device.

In a production advisory system (PAS), there are two missing links to complete the end-to end-solution. A user or operator may have poor models or no models, and may lack expertise and experience building models, calibrating different parts of the models, and ensuring that the models are accurate. After the models are built, they may soon be out of date. As such, one problem is how to make the model continuously accurate and up-to-date. Another problem relates to feedback. More particularly, conventional models may have a difficult time obtaining enough feedback data, the feedback data may be of poor quality, or the feedback data may be difficult to integrate into the model to update the model.

Figure 10:
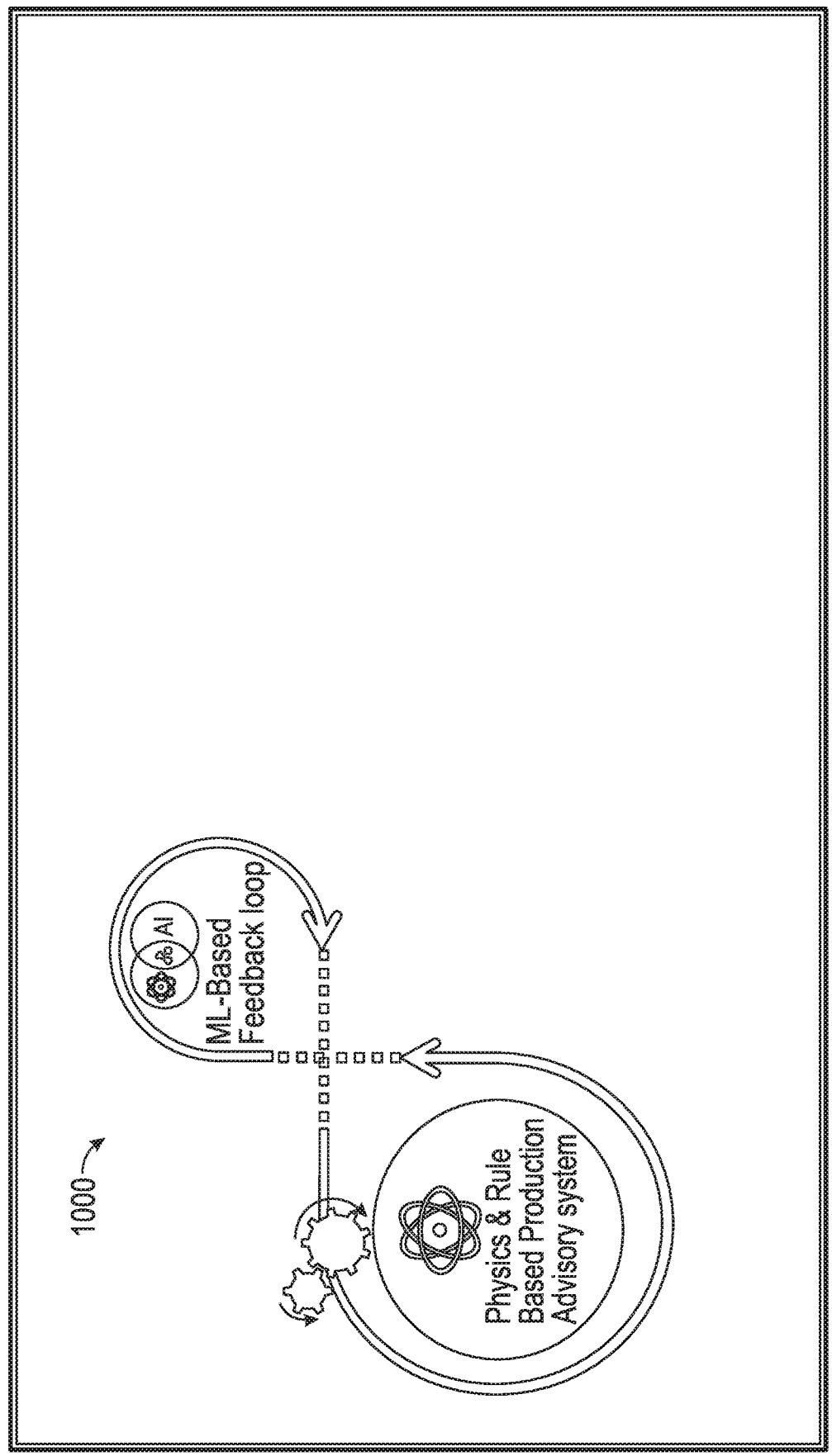
FIG. 10 illustrates a schematic view of a solution overview, according to an embodiment.

FIG. 10 illustrates a schematic view of a solution overview 1000, according to an embodiment. To fill the gaps, an automatic model builder may be used to build, calibrate, and update the models. To effectively use feedback, a feedback loop has been incorporated into the AI solution to combine the power of physics and data to reach true insights.

Figure 11:
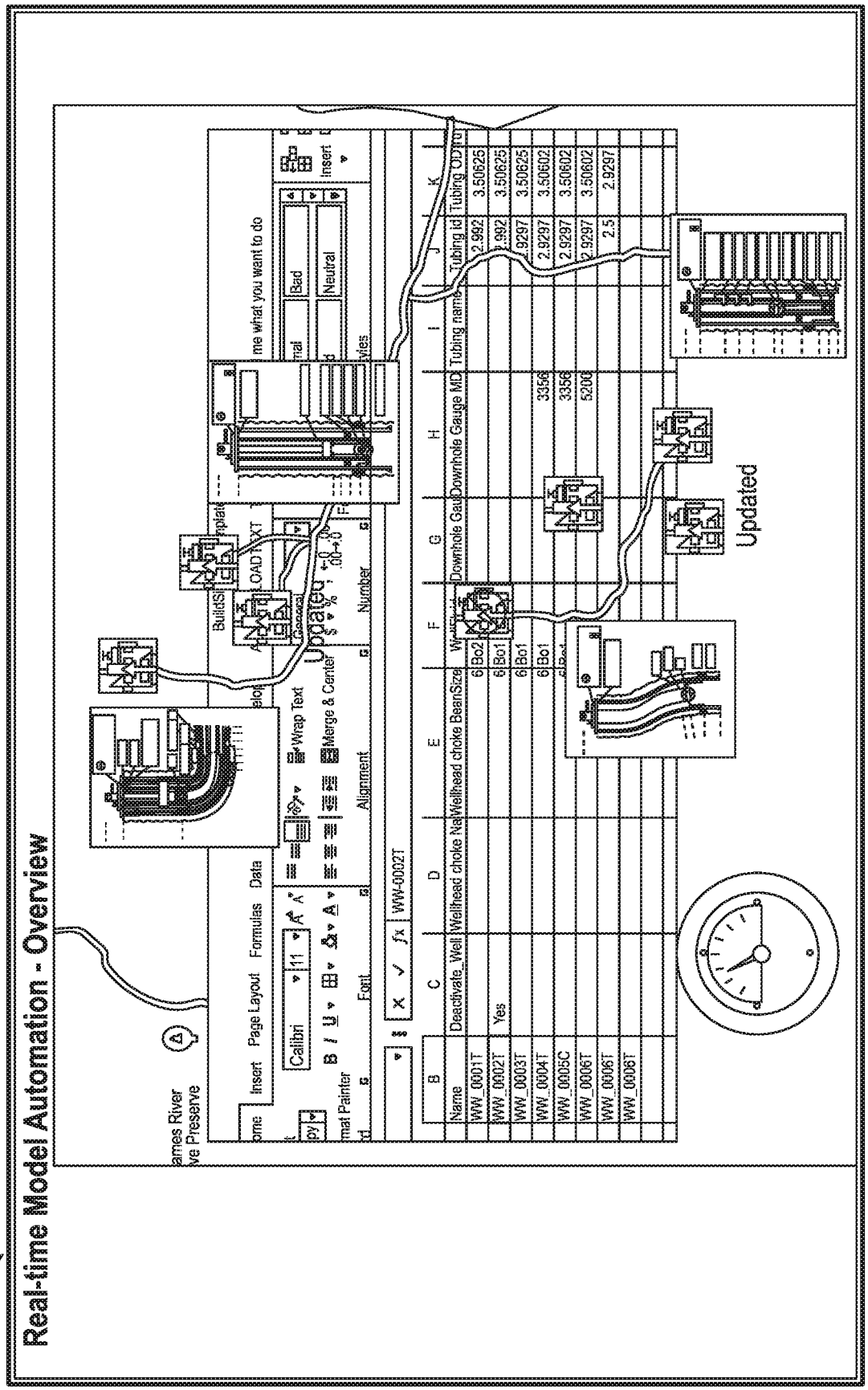
FIG. 11 illustrates a schematic view of a real-time model automation, according to an embodiment.

FIG. 11 illustrates a schematic view of a real-time model automation 1100, according to an embodiment. Once a user provides well information, one or more single well models may be automatically created. Flowline information may be extracted from a GIS file (e.g., shapefile) to form a flowline model by itself. A self-checking system may test and calibrate the model. When new data becomes available, a real-time model update may be triggered to make sure that the model is up to date.

Figure 12:
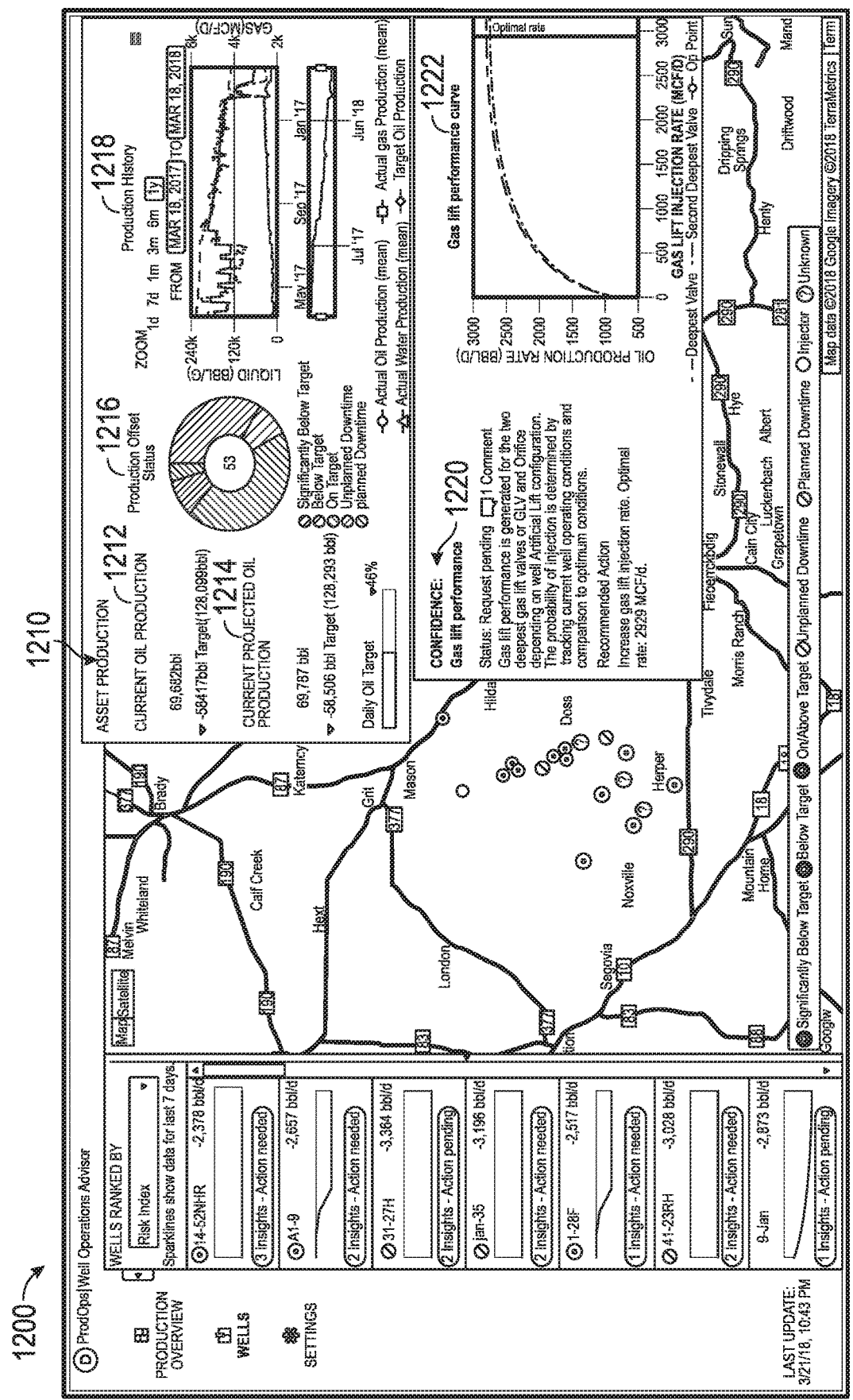
FIG. 12 illustrates a schematic view of a well operation advisor, according to an embodiment.

FIG. 12 illustrates a schematic view of a well operation advisor 1200 including asset production 1210 and confidence 1220, according to an embodiment. The asset production 1210 includes current oil production 1212, current projected oil production 1214, production offset status 1216, and production history 1218. The confidence 1220 includes a gas lift performance curve 1222. The centralized production advisor starts monitoring the health of production systems. It provides goals in the oil field and insights into the behavior of individual wells.

Figure 13:
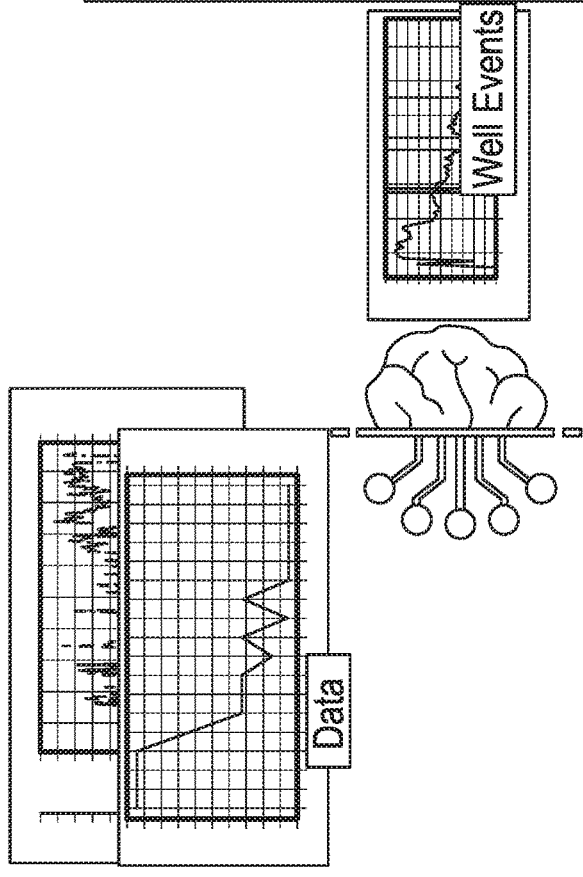
FIG. 13 illustrates a schematic view of an AI-assisted production advisory system, according to an embodiment.

FIG. 13 illustrates a schematic view of an AI-assisted production advisory system 1300, according to an embodiment. A list of insights may be generated. The list may then be processed to improve the accuracy. An advanced deep learning strategy may be used to combine the production history and the physics-based model solution and well events (e.g., consequence/feedback). As the machine learns from multiple iterations of feedback, the updated knowledge may be used to filter out inaccurate model predictions, leaving a single source of truth for well insights.

Figure 14:
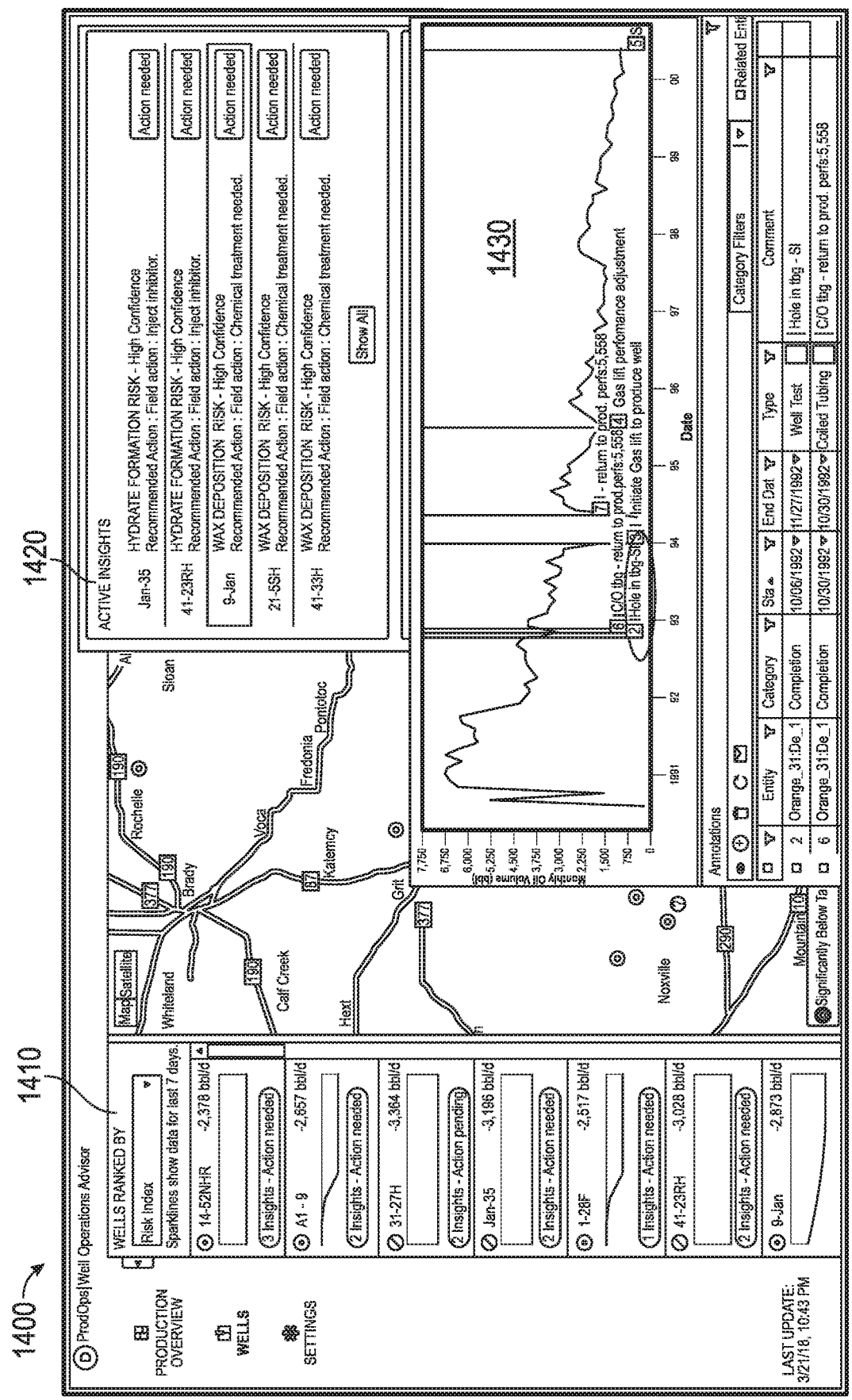
FIG. 14 illustrates another schematic view of the well operation advisor, according to an embodiment.

FIG. 14 illustrates another schematic view of the well operation advisor 1400, according to an embodiment. The well operation advisor 1400 may include wells ranked by risk index 1410, active insights 1420, and monthly oil volume 1430. With a shortened insight list, inspection tickets may be generated and sent to field engineers with instructions for action. The history may be reviewed to find unexpected issues that are unpredictable with the current model solution. This may trigger a new learning process.

Figure 15:
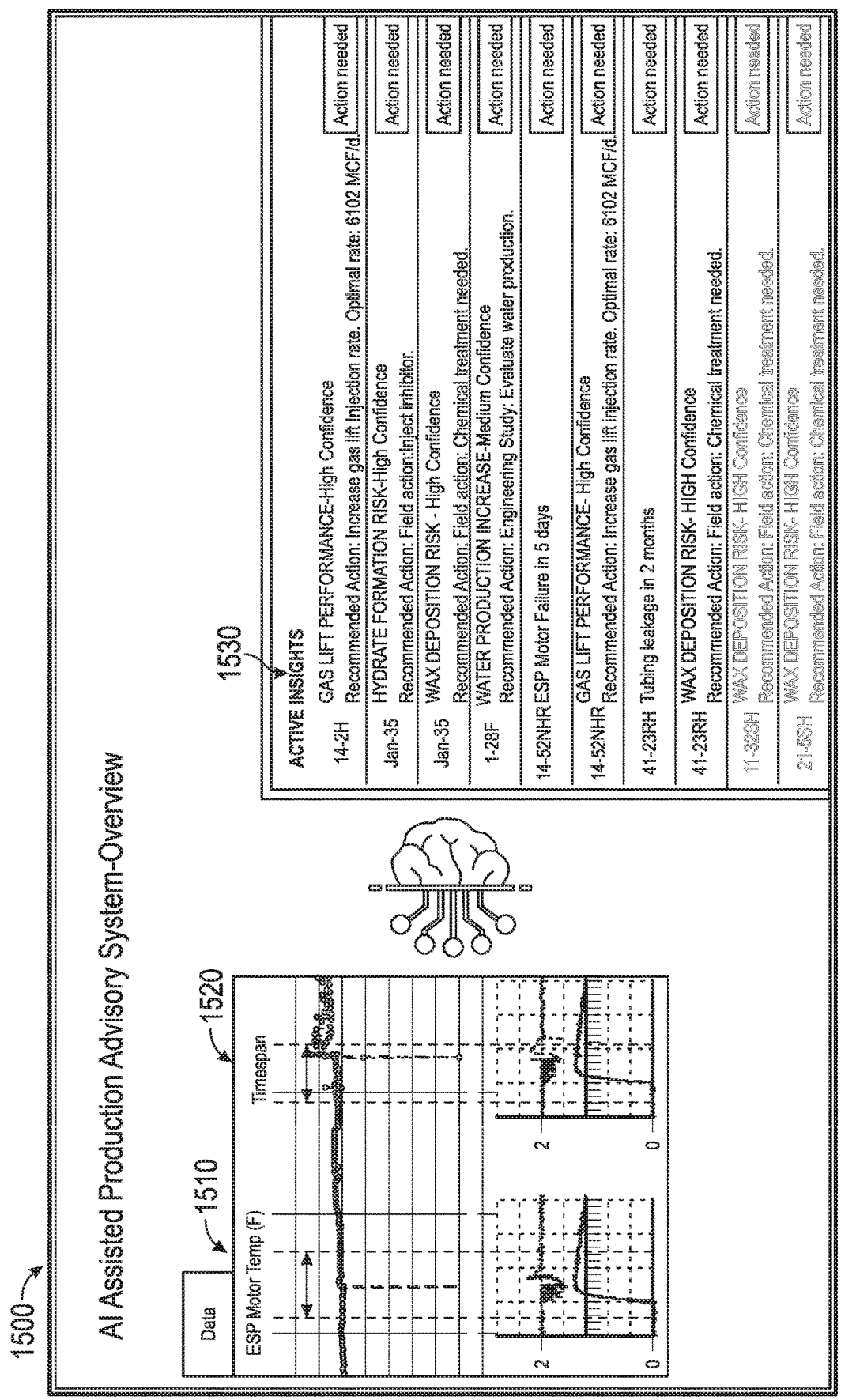
FIG. 15 illustrates another schematic view of the AI-assisted production advisory system, according to an embodiment.

FIG. 15 illustrates another schematic view of the AI-assisted production advisory system 1500, according to an embodiment. The system 1500 may include graphs showing electronic submersible pump (ESP) motor temperature 1510, and timespan 1520. The system 1500 may also include active insights 1530. By analyzing the relevant data pattern, considering the time factor, the AI system may recognize failures that are not predicted by model solutions, such as ESP, tubing/casing leakage, etc. Thus, the system may be proactive rather than reactive. This may enable a user to plan for predictable failures to minimize the downtime. As more data becomes available, the system self-adapts through a reinforcement learning process to weigh model insights and add new failure patterns in order to enhance the model prediction.

Figure 16:
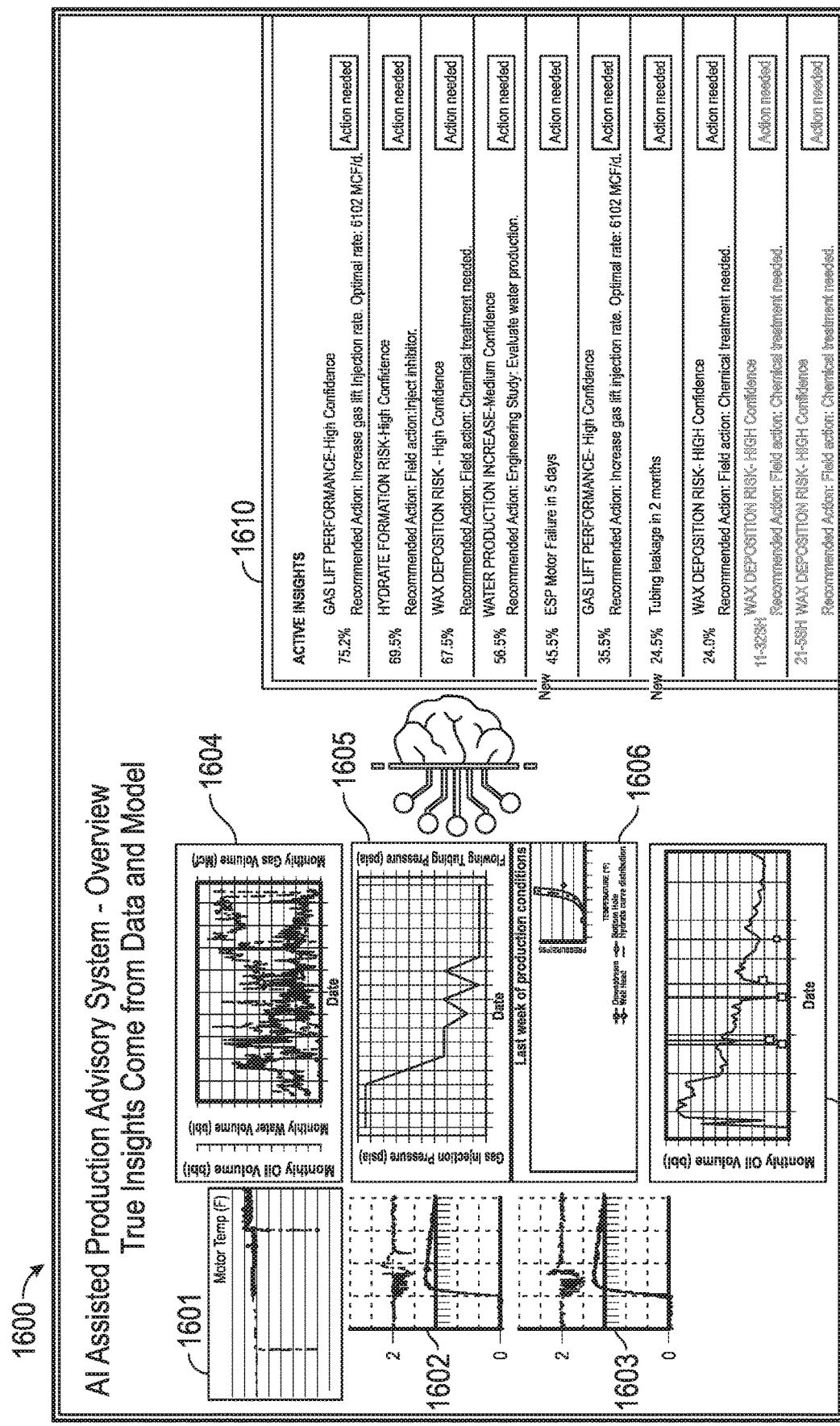
FIG. 16 illustrates another schematic view of the AI-assisted production advisory system, according to an embodiment.

FIG. 16 illustrates another schematic view of the AI-assisted production advisory system 1600, according to an embodiment. The system 1600 may include a plurality of graphs (e.g., seven are shown: 1601-1607) and a set of active insights 1610.

Figure 17:
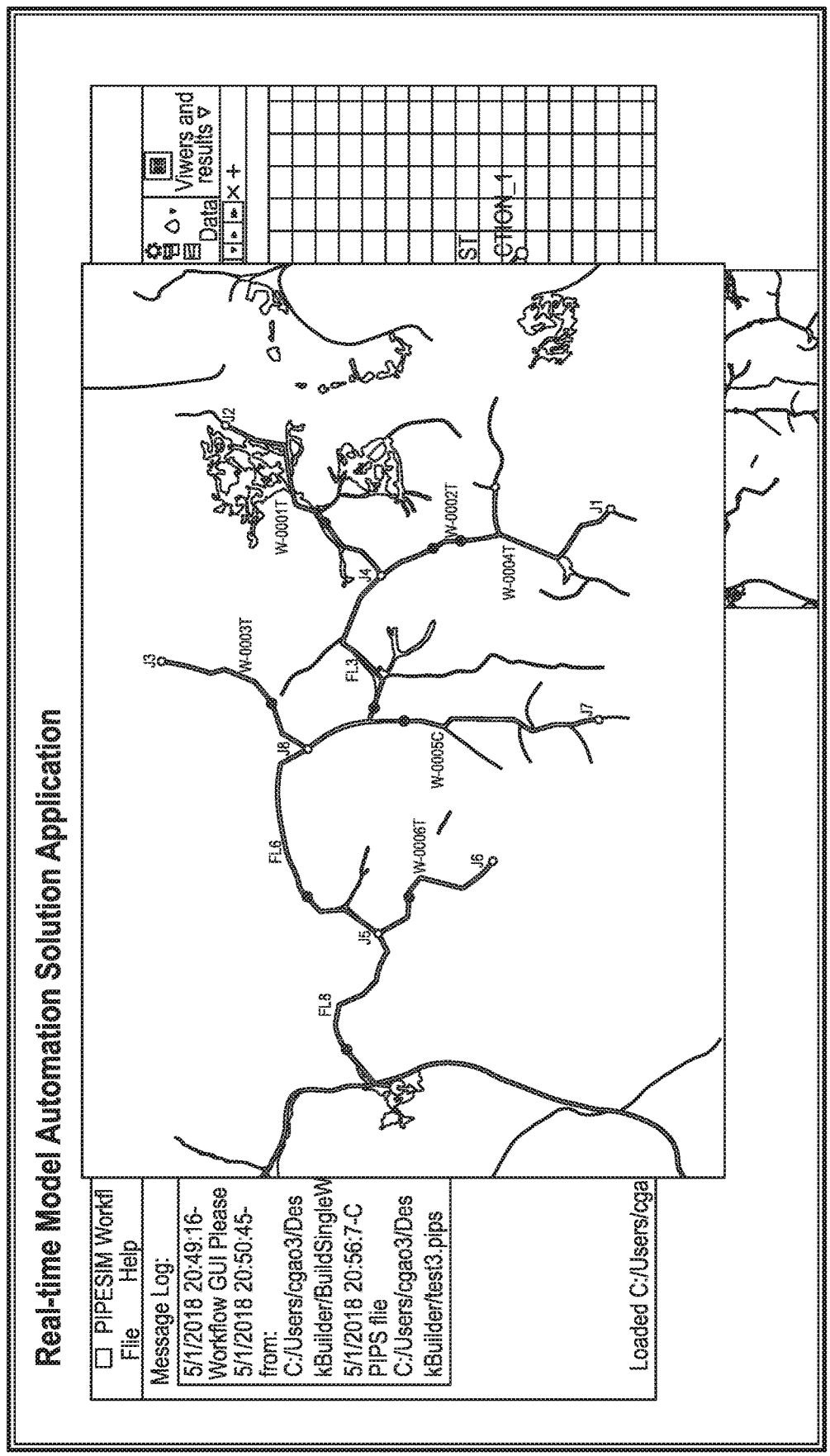
FIG. 17 illustrates a schematic view of a real-time model automation solution application, according to an embodiment.

FIG. 17 illustrates a schematic view of a real-time model automation solution application 1700, according to an embodiment. Well data may be received, which includes well names, tubing, casing, completion, and downhole equipment. A set of software instructions may then be run to generate the well in PIPESIM® from the data. Using an existing feature in PIPESIM®, a flowline network may be imported from a shapefile and incorporate elevation information from GIS data to build accurate and detailed flowline models. The well models are then integrated with the flowline models to form a complete network model. The generated wells and network are then calibrated and validated with well test data. For example, the well productivity index (PI) can be calculated for each completion. When operation conditions change in the field, the model may be updated with the more recent data. The user may update the selected wells without having to rebuild the whole network.

Figure 18:
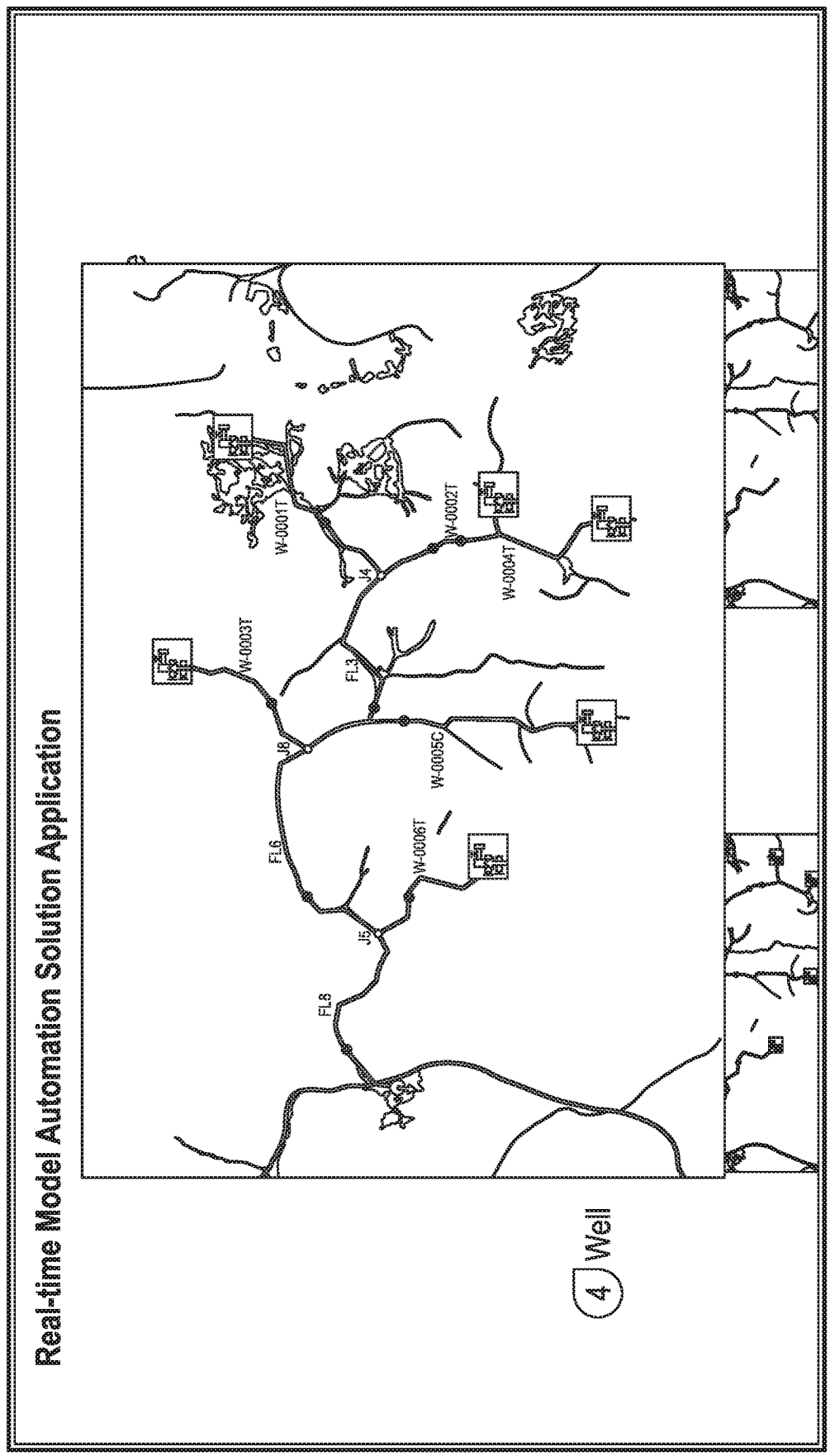
FIG. 18 illustrates another schematic view of the real-time model automation solution application, according to an embodiment.
Figure 19:
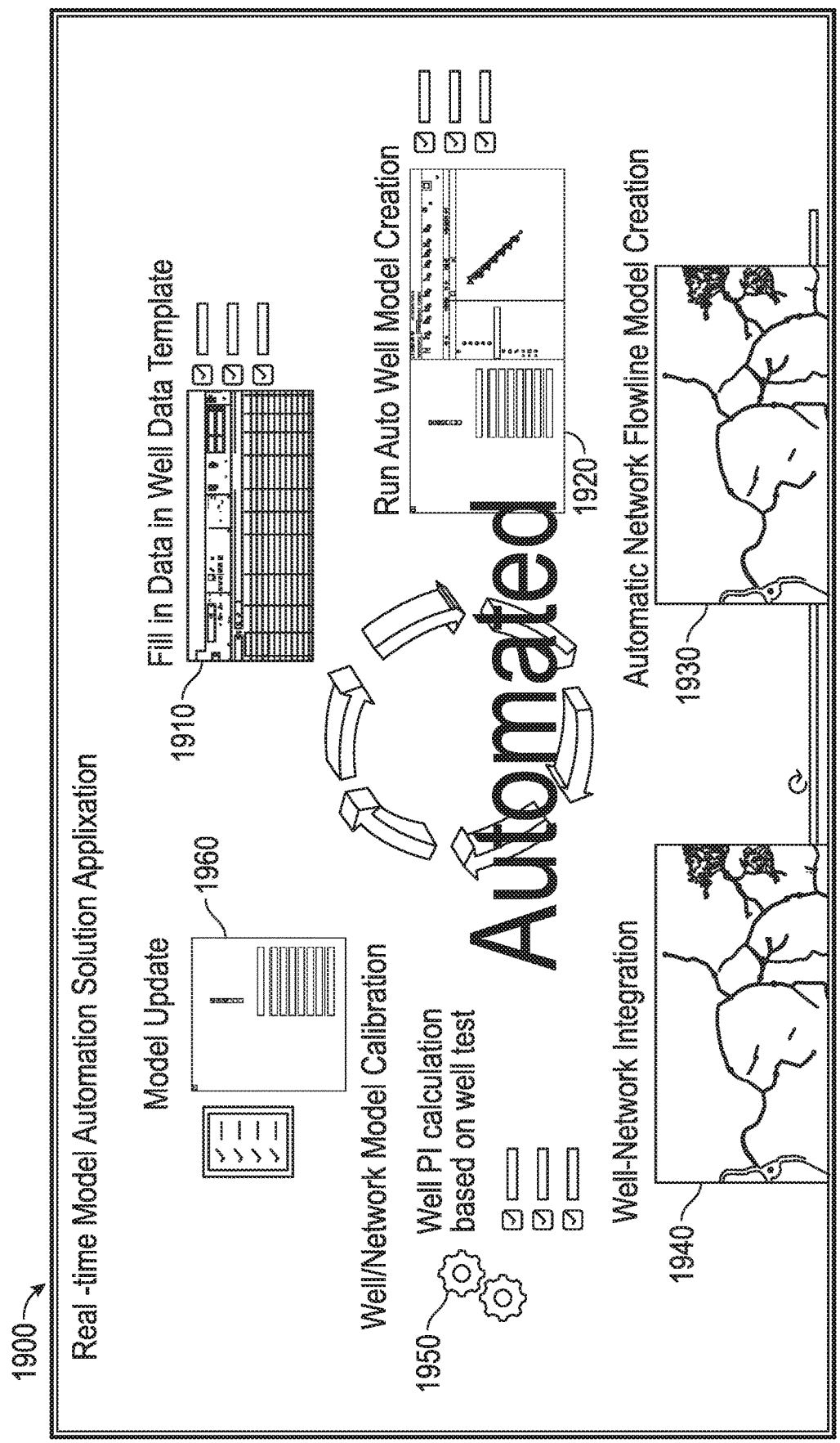
FIG. 19 illustrates another schematic view of the real-time model automation solution application, according to an embodiment.

FIG. 18 illustrates another schematic view of a real-time model automation solution application 1800, according to an embodiment. FIG. 19 illustrates another schematic view of a real-time model automation solution application 1900, according to an embodiment. The application 1900 may include receiving data 1910, building a well model 1920, building a network flowline model 1930, combining/integrating the well model and the network flowline model 1940, calibrating the combined model 1950, and updating the combined model 1960.

Figure 20:
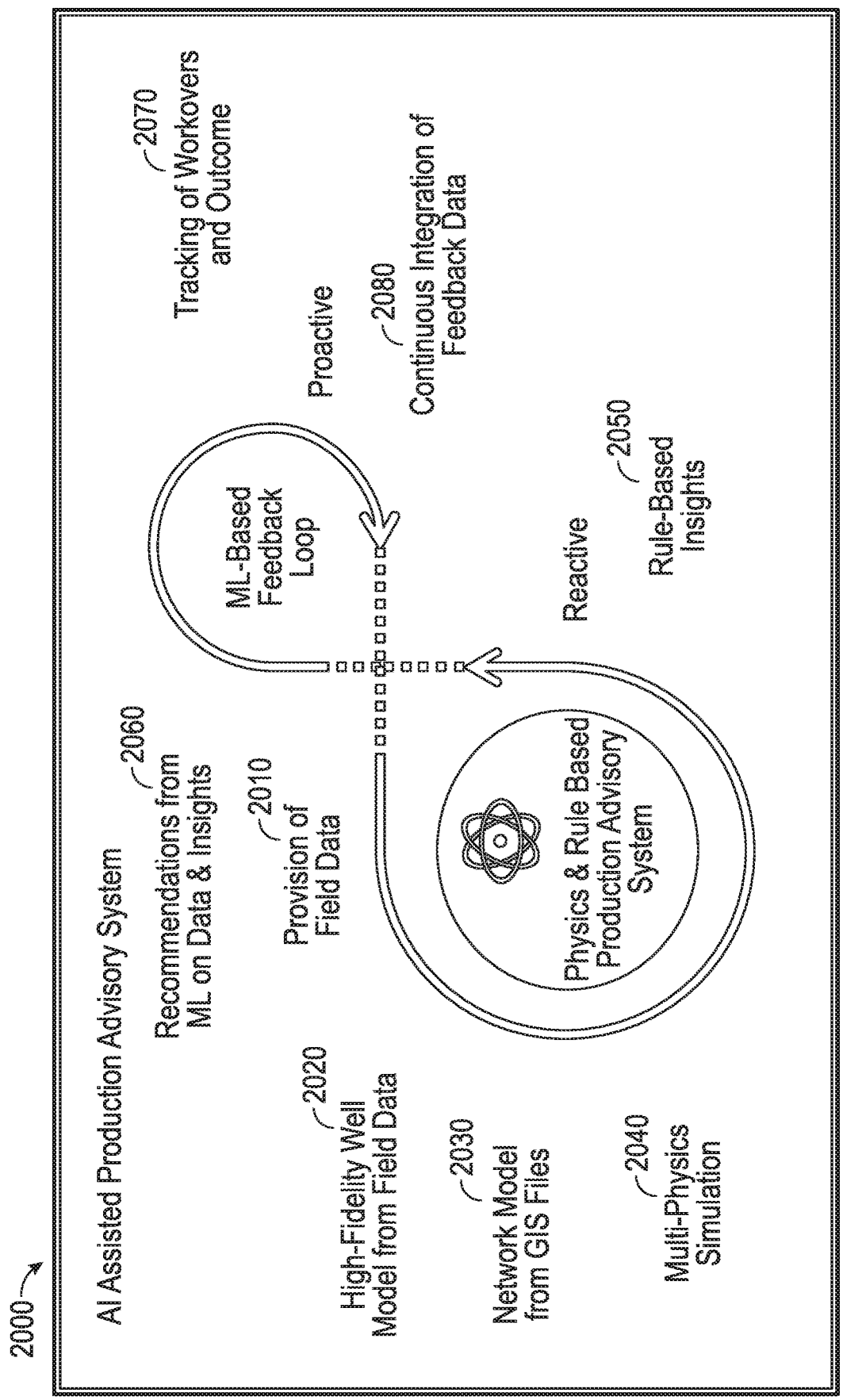
FIG. 20 illustrates another schematic view of the AI-assisted production advisory system, according to an embodiment.

FIG. 20 illustrates another schematic view of the AI-assisted production advisory system 2000, according to an embodiment. For example, the system 2000 may include receiving field data at 2010, building a well model at 2020, building a network model at 2030, performing a simulation on the well model the network model, or a combination thereof at 2040, obtaining rule-based insights at 2050, generating a recommendation to solve or improve a problem based on the rule-based insights at 2060, implementing and tracking the recommendation at 2070, and feeding data related to the implementation back into the system at 2080. This may allow a user to build an automated end-to-end loop from field data, high-fidelity well and network models, multi-physics simulations, and rule-based insights to support decisions on current operations. Another machine-learning feedback loop may be added, so that the field production history, together with the decisions and corresponding outcome may be utilized to provide more reliable recommendations. This may be based on current operation conditions and trends of recent history. Preventative measures may be taken for problems that may happen in the near future. The decisions made by field engineers, the workover results, and the unexpected issues may be tracked and continuously integrated into the feedback loop.

Referring again to FIG. 6, the AI-assisted system starts from the history of production data, decisions, and insights. From this, the system may extract a number of features that can feed into a machine-learning model, such as a dense neural network. Because well events for a single well may be scarce, the system may introduce clustering algorithm(s) to group wells that are physically close to one another, or producing from the same reservoir layer, in a training dataset. The recommendation from the machine-learning model may help production engineers make more informed decisions on issues that are happening or likely to happen, and to provide remedial plan to solve the problems. The decisions and outcomes may then be published as part of the history, to be used for the next recommendation.

Figure 21:
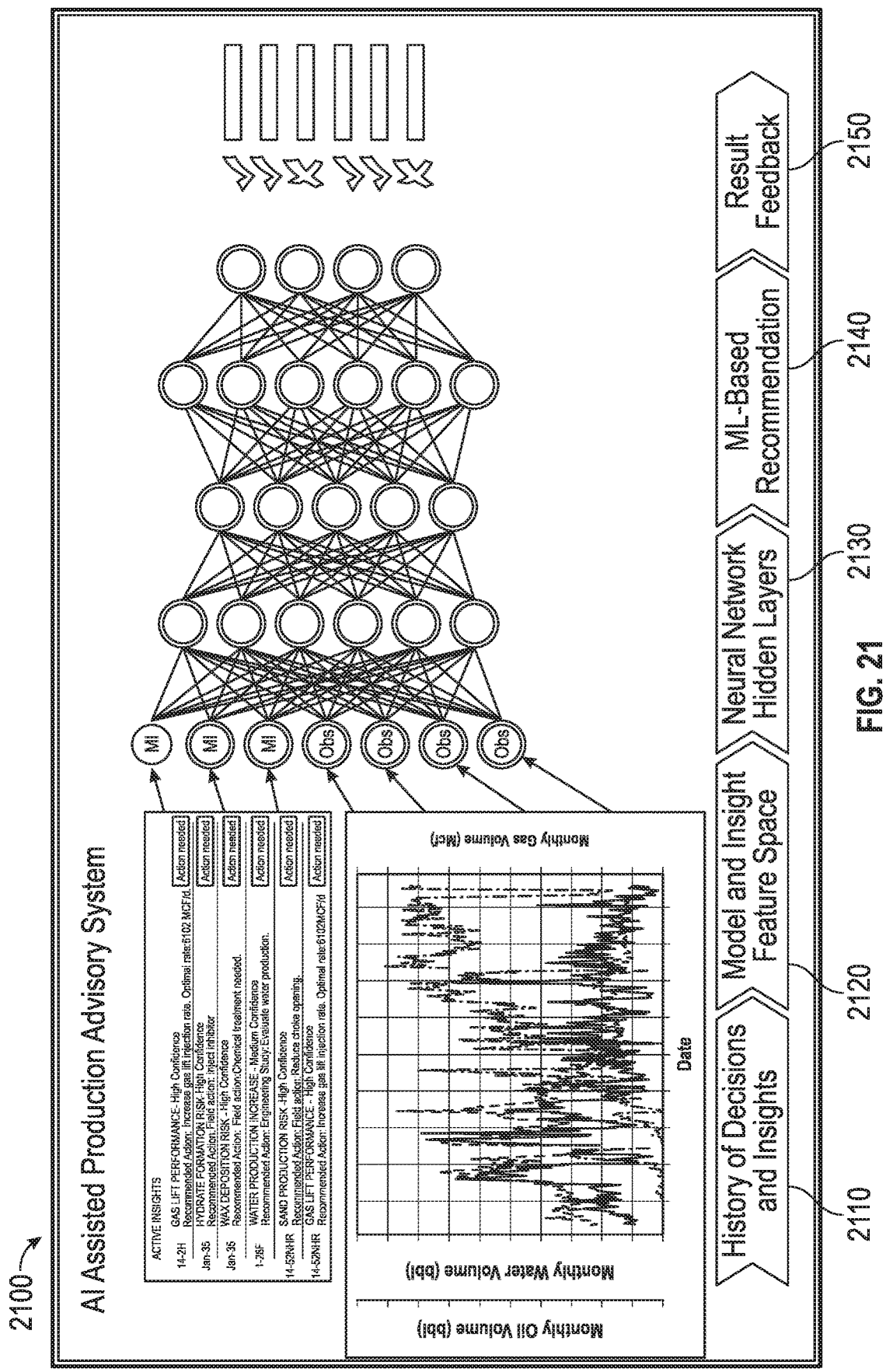
FIG. 21 illustrates another schematic view of the AI-assisted production advisory system, according to an embodiment.

FIG. 21 illustrates another schematic view of the AI-assisted production advisory system 2100, according to an embodiment. The system 2100 may include a history of decisions and insights 2110, a model and insight feature space 2120, a neural network of hidden layers 2130, a machine-learning based recommendation, 2140, and a result feedback 2150.

Figure 22:
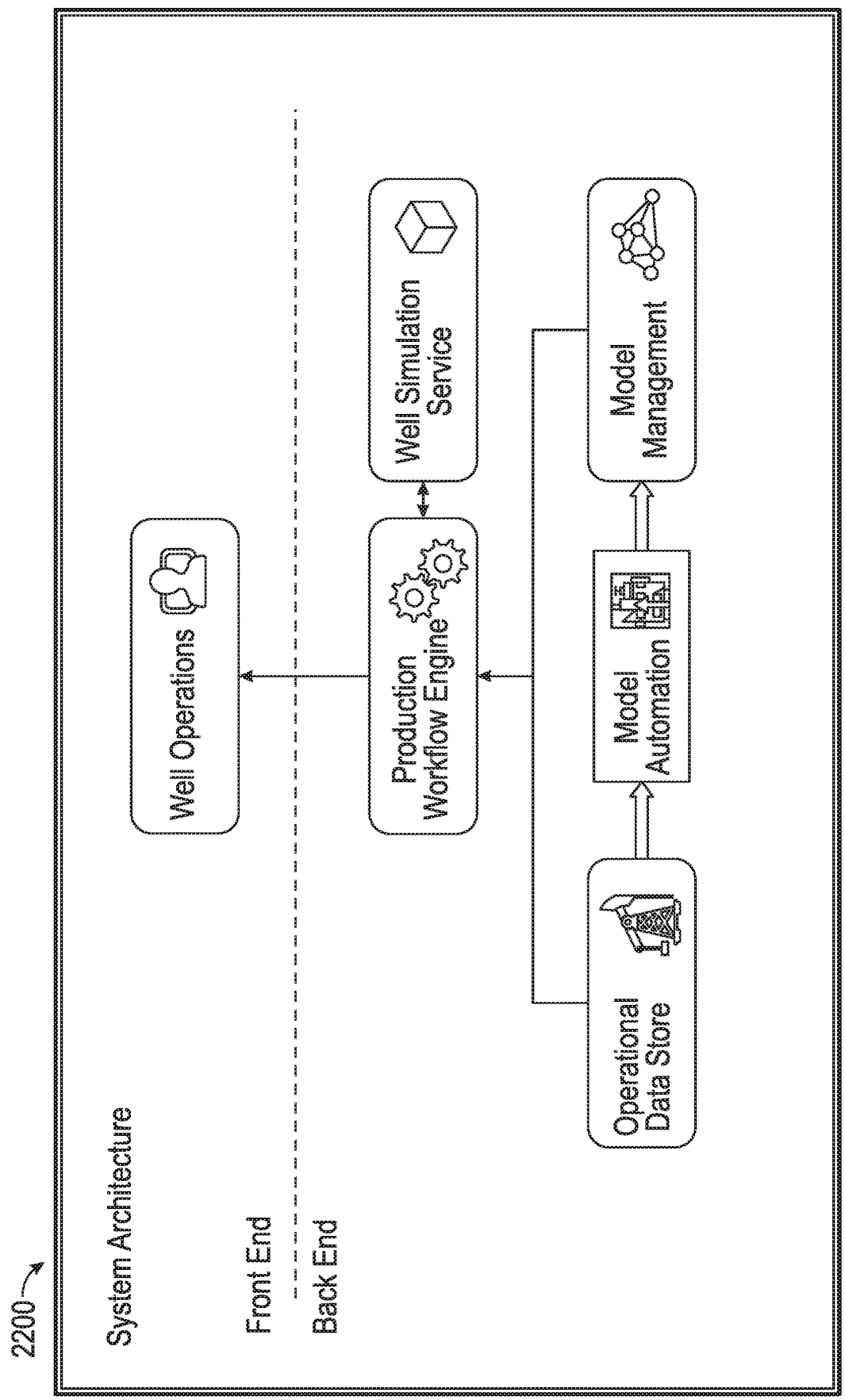
FIG. 22 illustrates another schematic view of the system architecture, according to an embodiment.

FIG. 22 illustrates a schematic view of the system architecture 2200, according to an embodiment. The AI feedback loop utilizes the history of data and insights from the production workflow engine and provides AI-assisted recommendations. These recommendations may be made available to the front end through the production workflow engine. The AI-assisted system may also be extended by allowing different machine-learning options. For example, a different timespan of data may be used as the model input. In another example, a variety of combinations of input features may be used. The user may define a customized KPI. Different clustering methods may be used to group wells together in training data sets. Different machine learning models may also be supported. The closed-loop system may allow the user to take advantage of the abundance of data from digital oilfield technologies and to continuously improve the production operation with a system that keeps learning.

Figure 24:
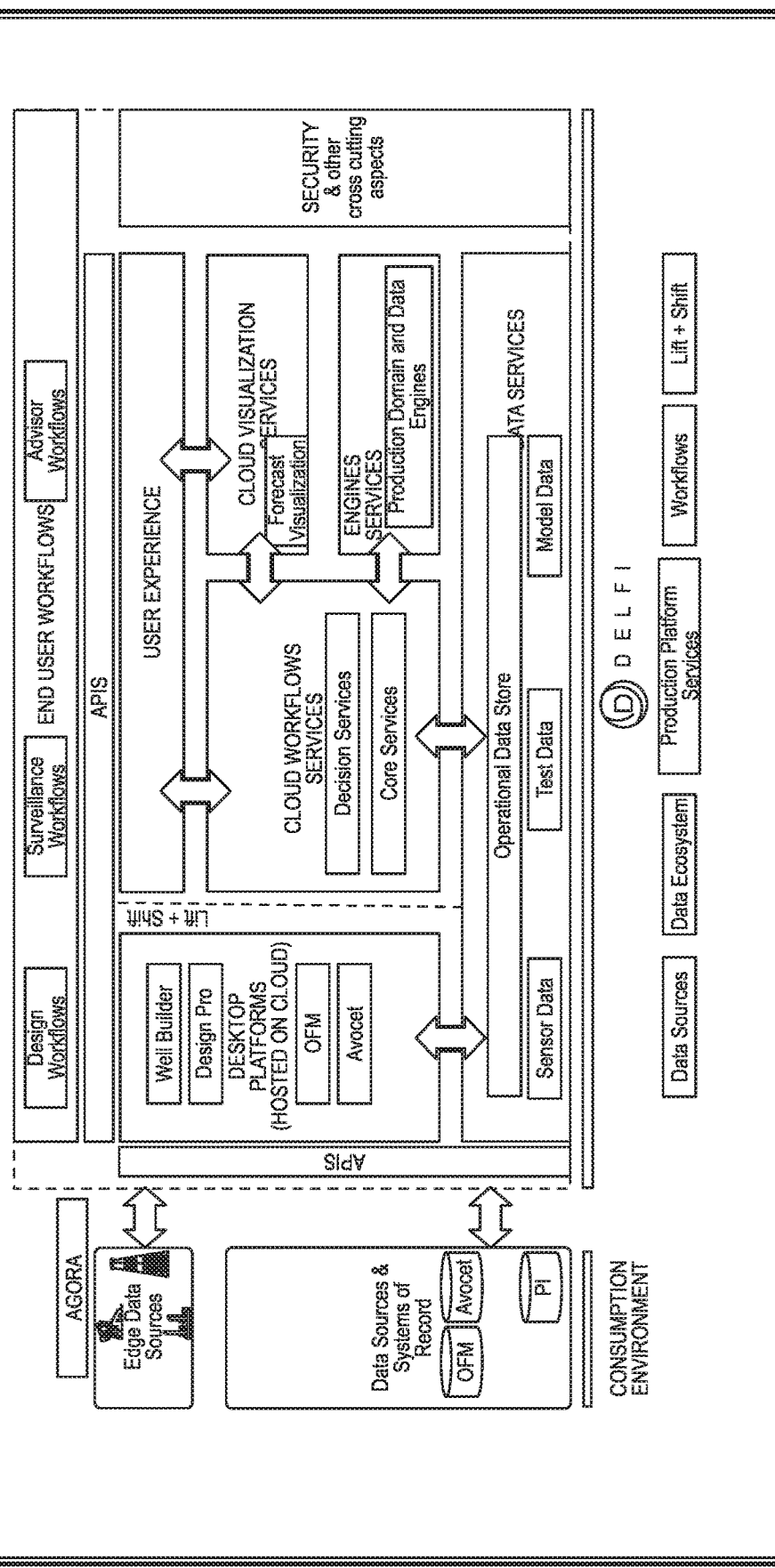
FIG. 24 illustrates a schematic view of a production platform (e.g., DELFI architecture view), according to an embodiment.

FIG. 23 illustrates a schematic view of a way to make effective use of data and technology 2300, according to an embodiment. The manual model construction and calibration processes may be replaced with built-in expertise and experience. The model may be continuously usable. The AI-assisted advisory system may integrate knowledge into a single source of the truth for well insights integrity. This may reduce well downtime by proactive service. FIG. 24 illustrates a schematic view of a production platform (e.g., DELFI architecture view) 2400, according to an embodiment.

Figure 25:
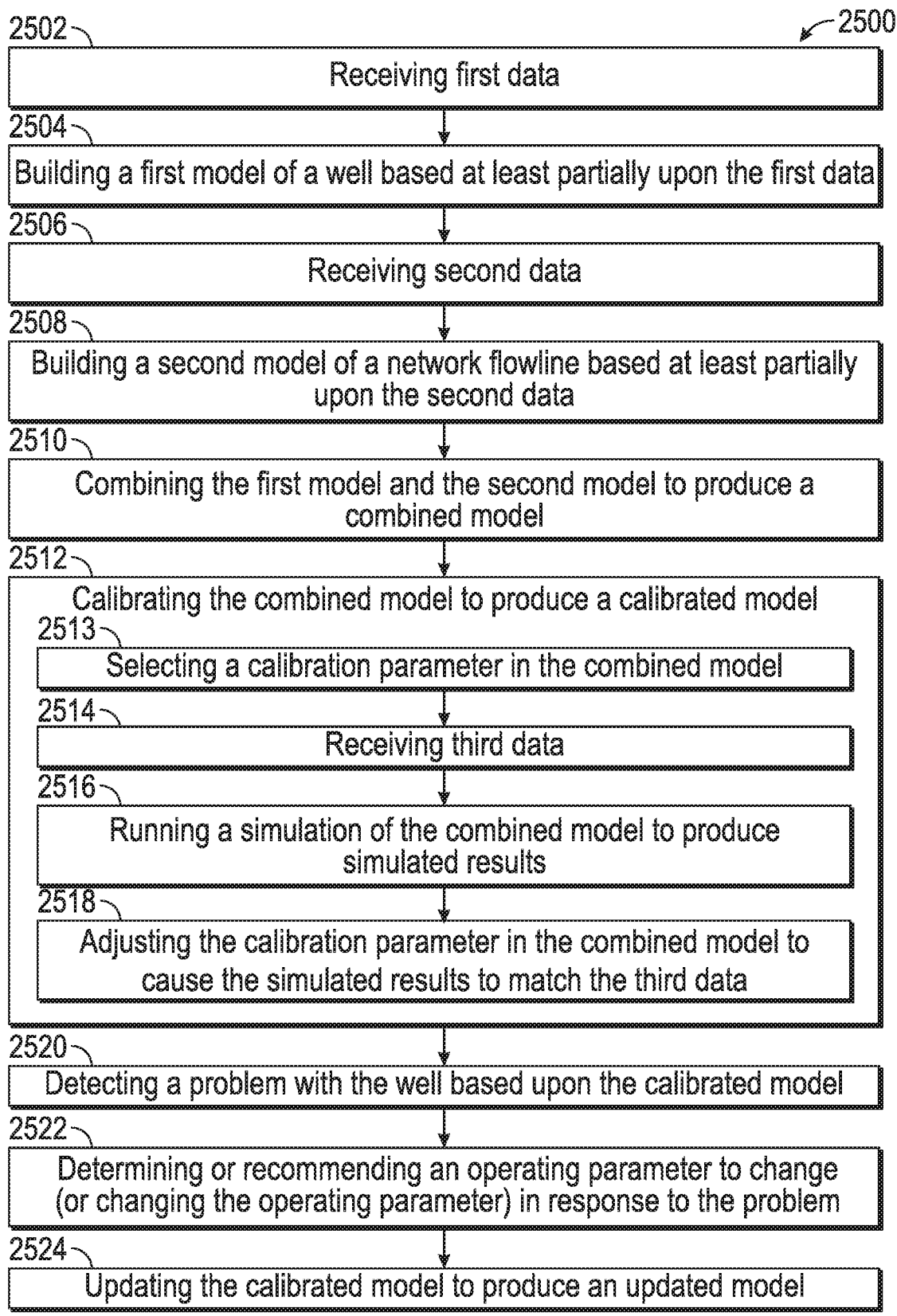
FIG. 25 illustrates a flowchart of a method for building a model, according to an embodiment.

FIG. 25 illustrates a flowchart of a method 2500 for building a model, according to an embodiment. The method 2500 may include receiving first data, as at 2502. An example of this is shown at 1910 in FIG. 19. The first data may be or include static data or dynamic data. The first data may be real-time data or may not be real-time data. The first data may be or include well completion data, well survey data, fluid data, or a combination thereof. The well completion data may be or include the name(s) of one or more wells, a wellhead choke size (also referred to as a choke bean size), an inner and outer diameter of a tubing in a well, a bottom depth measurement of the tubing, an inner and outer diameter of a casing in the well, a bottom depth measurement of the casing, artificial lift parameters, the completion type (e.g., horizontal or vertical) and completion depth in the well, the reservoir pressure and temperature, IPR model type, the gas/liquid productivity index, or the like.

The well survey data may be or include a trajectory of the well. This may include a measurement depth of the well and a true vertical depth of the well. The fluid data may be or include a specific gravity of gas and water, a gas-oil ratio (GOR), water cut, API, or the like. The method 2500 may also include building a first model of a well based at least partially upon the first data, as at 2504. An example of this is shown at 1920 in FIG. 19.

The method 2500 may also include receiving second data, as at 2506. The second data may be or include a shapefile, which may be in a geospatial vector data format for geographic information system (GIS) software. The shapefile format can spatially describe vector features such as points, lines, and polygons, representing, for example, a wellsite (including the well), rivers, lakes, mountains, etc. Each item/object may have attributes that describe it, such as name or temperature. The shapefile may also include flowlines with names. The flowlines may have attributes such as name and where the flowlines connect to and from. The flowlines may form a network that allows fluid to flow from the well (or a plurality of wells) to a receiving station. The method 2500 may also include building a second model of a network flowline based at least partially upon the second data, as at 2508. An example of this is shown at 1930 in FIG. 19. In at least one embodiment, the second data (e.g., the shapefile) may be the second model, and step 2508 may be omitted.

The method 2500 may also include combining the first model and the second model to produce a combined model (also referred to as a combined network model), as at 2510. An example of this is shown at 1940 in FIG. 19. The first and second models may be combined using geographic data. For example, the first and second models may be overlapped using geographic latitude and longitude coordinates to assist with the alignment.

The method 2500 may also include calibrating the combined model to produce a calibrated model, as at 2512. The calibrated model may represent the production system at the wellsite. An example of this is shown at 1950 in FIG. 19. Calibrating the combined model may include selecting one or more calibration parameters in the combined model, as at 2513. One illustrative calibration parameter may be or include, for example, productivity index of fluid flowing out of the well. More particularly, the calibration parameter may be or include the volume of fluid flowing out of the well per unit pressure of drawdown. Calibrating the combined model may also include receiving third data, as at 2514. The third data may be or include static data or dynamic data. For example, the third data may be or include measured well test data including parameters such as a flowrate of the fluid being pumped into the well or flowing out of the well, phases (e.g., oil, gas, water) of the fluid flowing out of the well, wellhead pressure and temperature, casing head pressure, operating choke size, gas lift injection rate, downhole pressure and temperature, pressure and/or temperature profile survey data to select fluid flow correlations with calibrated friction and holdup factors, fluid analysis reports to calibrate a fluid model, and artificial lift performance data to calibrate artificial lift tuning parameters. Calibrating the combined model may also include running a simulation of the combined model to produce simulated results, as at 2516. The simulated results may include the same types of parameters as the third data (e.g., flowrate, phases, etc.). Calibrating the combined model may also include adjusting one or more of the calibration parameters (e.g., productivity index) in the combined model to cause the simulated results to match the (e.g., measured) third data, as at 2518. In another embodiment, the third data may be omitted, and the calibration parameter(s) may be adjusted to cause the simulated results to match the first data.

The method 2500 may also include detecting a problem with the well based at least partially upon the calibrated model, as at 2520. For example, the problem may be or include a decreased performance of an artificial lift in the well, wax decomposition in the well (e.g., when the well is an oil well), hydrate formation in the well (e.g., when the well is a gas well), excessive drawdown in the well, erosion risk in the well, unstable flow into, out of, or within the well, or the like. In one embodiment, step 2520 may be omitted.

The method 2500 may also include determining or recommending an operating parameter to change (or changing the operating parameter), as at 2522. The operating parameter may be changed in response to the calibrated model and/or the problem. For example, if the problem is decreased performance of a gas lift well, an operator may adjust the gas lift injection rate or injection pressure to a higher value. In another example, if the problem is wax decomposition and/or hydrate formation in the well, an operator may introduce a chemical treatment (e.g., an inhibitor injection) into the well. In another example, if the problem is excessive drawdown and/or erosion risk in the well, an operator may reduce the size of the choke opening. In one embodiment, step 2522 may be omitted.

The method 2500 may also include updating the calibrated model to produce an updated model, as at 2524. An example of this is shown at 1960 in FIG. 19. In at least one embodiment, the calibrated model may be updated to reflect the change in the operating parameter.

Figure 26:
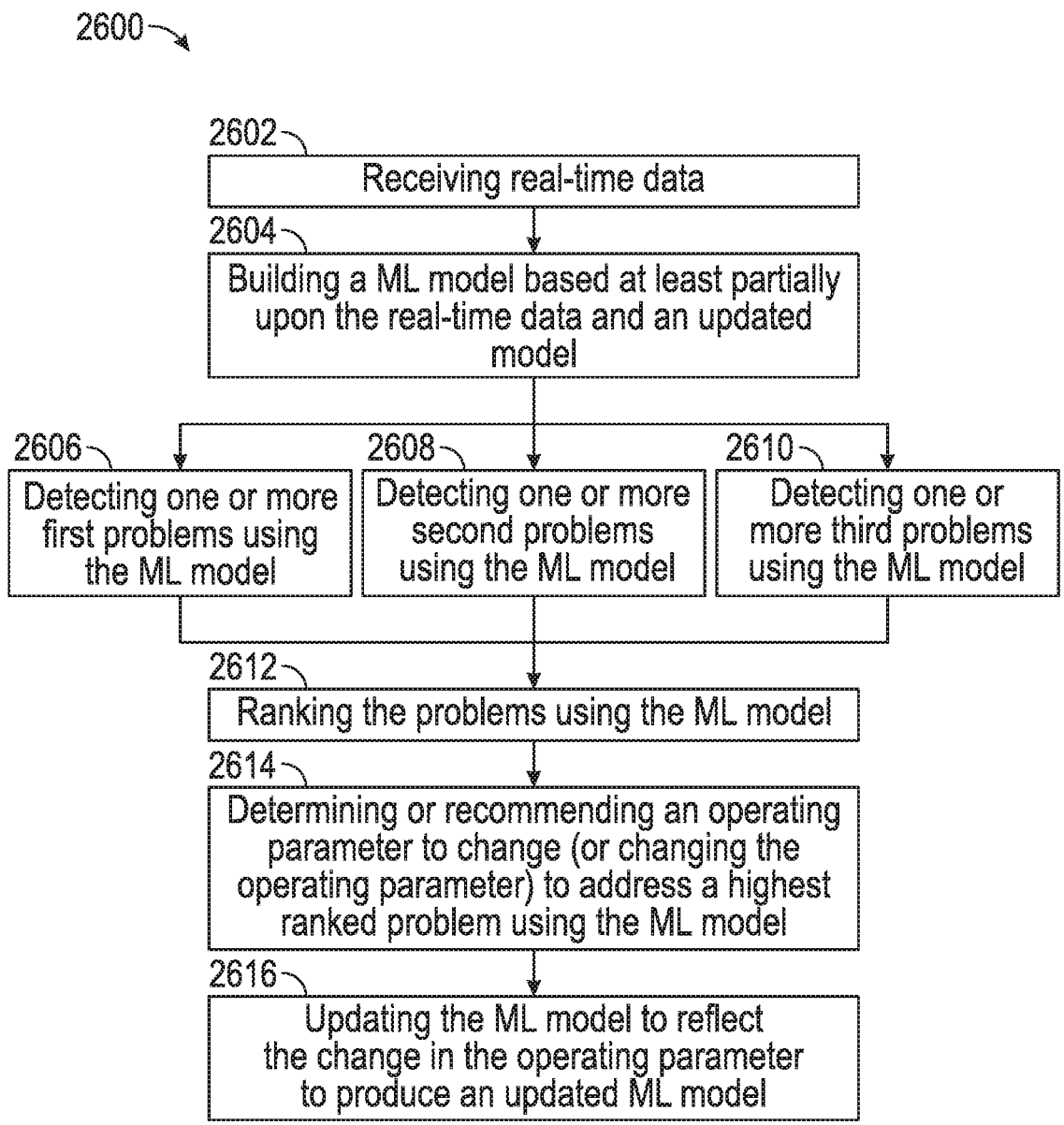
FIG. 26 illustrates a flowchart of a method for ranking and solving wellsite problems, according to an embodiment.

FIG. 26 illustrates a flowchart of a method 2600 for ranking and solving wellsite problems, according to an embodiment. The method 2600 may include receiving real-time data, as at 2602. The real-time data may be or include dynamic data (e.g., data that changes with time) that is measured with one or more sensors. For example, the real-time data may be or include a flowrate of the fluid being pumped into the well or flowing out of the well, phases (e.g., oil, gas, water) of the fluid flowing out of the well, wellhead pressure and temperature, casing head pressure, downhole pressure and temperature, or the like.

The method 2600 may also include building a machine-learning (ML) model based at least partially upon the real-time data (from 2602) and a model (e.g., the updated model from 2524), as at 2604. In at least one embodiment, the updated model may be or include a physical representation of the wellsite, the well, the subterranean formation, or a combination thereof, and the ML model may not be or include a physical representation.

The method 2600 may also include detecting one or more first problems using the ML model, as at 2606. An example of this is shown at 2050 in FIG. 20. The one or more first problems may be detected based at least partially upon the real-time data. For example, this may include detecting that the well may shut down in a predetermined time period (e.g., 3 hours) based at least partially upon real-time data from an electronic submersible pump (ESP) at the well.

The method 2600 may also include detecting one or more second problems using the ML model, as at 2608. The one or more second problems may be detected based at least partially upon the model (e.g., the updated model from 2524). The one or more second problems may also or instead be based at least partially upon the combined model (from 2510) and/or the calibrated model (from 2512). For example, one of the second problems may be or include the gas-oil ratio being greater than a desired level or a projected fluid flow rate out of the well decreasing over time.

The method 2600 may also include detecting one or more third problems using the ML model, as at 2610. The one or more third problems may be detected based at least partially upon one or more predefined rules. For example, one of the predefined rules may be used to detect a problem when a water-to-oil ratio (WOR) of the fluid produced from the well increases by 0.2 when compared to an average or a peak value during the previous three months.

The method 2600 may also include ranking the problems (i.e., the one or more first problems, the one or more second problems, and the one or more third problems), as at 2612. The rankings may be based on a likelihood that each problem will occur. For example, one problem may have an 80% likelihood to occur, and another problem may have a 70% likelihood to occur. The rankings may also or instead be based on a seriousness of each problem. For example, one problem may threaten to shut down well operations for a day, and another problem may be fixable while the well continues to operate. The rankings may also or instead be based on an amount of time until the problem is predicted to occur. For example, one problem may be predicted to occur within the next two weeks, and another problem may be predicted to occur in a month. In at least one embodiment, the rankings may be weighted such that one technique for ranking the problems (e.g., likelihood that the problem will occur) is weighted greater than another technique (e.g., seriousness of the problem).

The method 2600 may also include determining or recommending an operating parameter to change (or changing the operating parameter) to address a highest ranked problem, as at 2614. An example of this is shown at 2060 and/or 2070 in FIG. 20. In one embodiment, a different operating parameter may be determined, recommended, or changed to address each of the problems. The changes to the operating parameters may be similar to those described above with respect to FIG. 25.

The method 2600 may also include updating the ML model to reflect the change in the operating parameter to produce an updated ML model, as at 2616. This may involve a continuous feedback loop. An example of this is shown at 2080 in FIG. 20.

Figure 27:
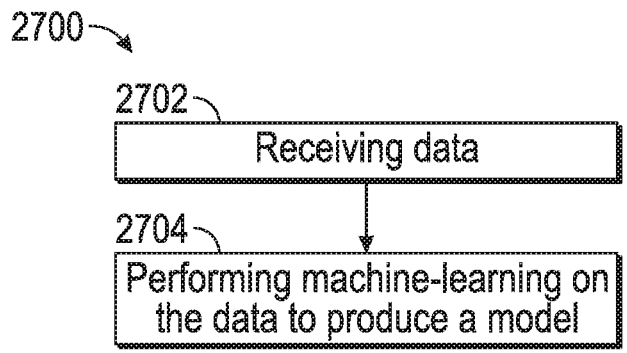
FIG. 27 illustrates a flowchart of a method for building a machine-learning (ML) model, according to an embodiment.

FIG. 27 illustrates a flowchart of a method 2700 for building a machine-learning (ML) model, according to an embodiment. The method 2700 may be used to build the ML model described above with reference to FIG. 26. The method 2700 may include receiving data, as at 2702. The data may be or include model insights, field measurements, actions, and/or consequences. The method 2700 may also include performing machine-learning on the data to produce the ML model, as at 2704. The ML model may be or include a trained ML model that provides a probability and/or confidence of the problems/insights described above.

Figure 28:
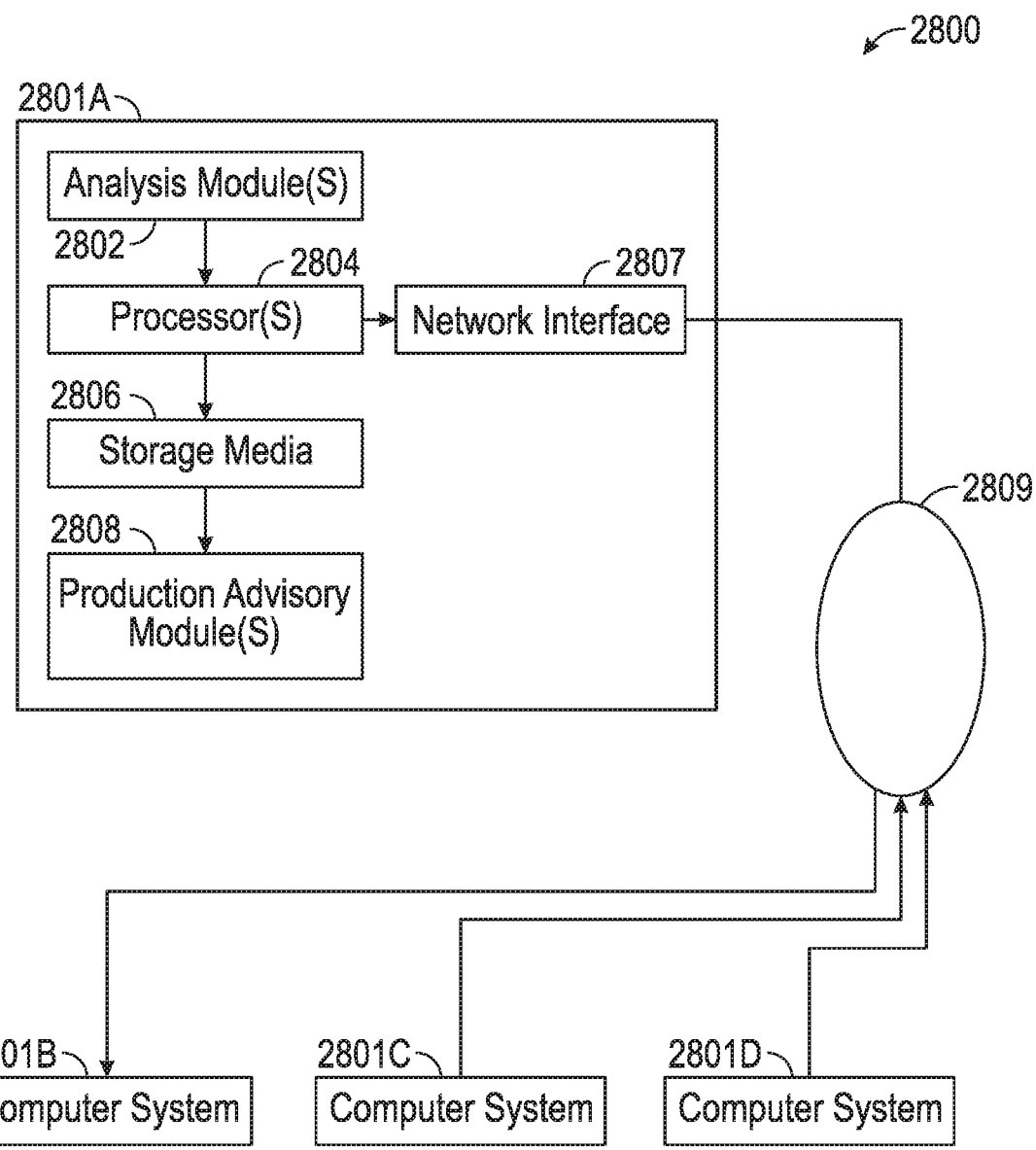
FIG. 28 illustrates a schematic view of a computing system for performing at least a portion of the method(s) described herein, according to an embodiment.

In some embodiments, any of the methods of the present disclosure may be executed by a computing system. FIG. 28 illustrates an example of such a computing system 2800, in accordance with some embodiments. The computing system 2800 may include a computer or computer system 2801A, which may be an individual computer system 2801A or an arrangement of distributed computer systems. The computer system 2801A includes one or more analysis module(s) 2802 configured to perform various tasks according to some embodiments, such as one or more methods disclosed herein. To perform these various tasks, the analysis module 2802 executes independently, or in coordination with, one or more processors 2804, which is (or are) connected to one or more storage media 2806. The processor(s) 2804 is (or are) also connected to a network interface 2809 to allow the computer system 2801A to communicate over a data network 2809 with one or more additional computer systems and/or computing systems, such as 2801B, 2801C, and/or 2801D (note that computer systems 2801B, 2801C and/or 2801D may or may not share the same architecture as computer system 2801A, and may be located in different physical locations, e.g., computer systems 2801A and 2801B may be located in a processing facility, while in communication with one or more computer systems such as 2801C and/or 2801D that are located in one or more data centers, and/or located in varying countries on different continents).

A processor can include a microprocessor, microcontroller, processor module or subsystem, programmable integrated circuit, programmable gate array, or another control or computing device.

The storage media 2806 can be implemented as one or more computer-readable or machine-readable storage media. Note that while in the example embodiment of FIG. 28 storage media 2806 is depicted as within computer system 2801A, in some embodiments, storage media 2806 may be distributed within and/or across multiple internal and/or external enclosures of computing system 2801A and/or additional computing systems. Storage media 2806 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLURAY® disks, or other types of optical storage, or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In some embodiments, computing system 2800 contains one or more production advisory module(s) 2808 for performing at least a portion of one or more of the methods 2500, 2600, 2700 described herein.

It should be appreciated that computing system 2800 is only one example of a computing system, and that computing system 2800 may have more or fewer components than shown, may combine additional components not depicted in the example embodiment of FIG. 28, and/or computing system 2800 may have a different configuration or arrangement of the components depicted in FIG. 28. The various components shown in FIG. 28 may be implemented in hardware, software, or a combination of both hardware and software, including one or more signal processing and/or application specific integrated circuits.

Further, the steps in the processing methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

Geologic interpretations, models and/or other interpretation aids may be refined in an iterative fashion; this concept is applicable to embodiments of the present methods discussed herein. This can include use of feedback loops executed on an algorithmic basis, such as at a computing device (e.g., computing system 2800, FIG. 28), and/or through manual control by a user who may make determinations regarding whether a given step, action, template, model, or set of curves has become sufficiently accurate for the evaluation of the subsurface three-dimensional geologic formation under consideration.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A method, comprising:
    receiving first data;
    building a first model of a well based at least partially upon the first data;
    receiving second data;
    building a second model comprising a network of flowlines based at least partially upon the second data, wherein at least one of the flowlines is connected to the well;
    combining the first model and the second model to produce a combined model;
    calibrating the combined model to produce a calibrated model, wherein calibrating the combined model comprises:
        receiving measured data;
        running a simulation of the combined model to produce simulated results; and
        adjusting a calibration parameter to cause the simulated results to match the measured data, wherein the calibration parameter comprises a productivity index of a fluid flowing out of the well;
    updating the calibrated model to produce an updated model;
    building a machine-learning (ML) model based at least partially upon real-time data and the updated model via an adaptive learning process comprising weighing one or more model insights and adding one or more failure patterns unrecognizable based on the simulated results, wherein the one or more failure patterns are associated with an electronic submersible pump (ESP) at the well, a gas-oil ratio or a water-to-oil ratio of the fluid flowing out of the well, a well valve, well tubing, well casing, a well pumping module, or any combination thereof; and
    generating, via the ML model, a proactive solution in response to predicting one or more potential problems based on one or more data patterns recognized in the real-time data and the one or more failure patterns, wherein the data patterns comprise at least ESP motor temperature, intake pressure, outlet pressure, and motor current amperage (amps), wherein the ML model is configured to provide a probability or confidence of the one or more potential problems or the one or more model insights, and wherein the proactive solution comprises a remedial plan to solve the one or more potential problems.

2. The method of claim 1, wherein the first data comprises well completion data, well survey data, fluid data, or a combination thereof, and wherein the second data comprises vector features of a well site that includes the well.

3. The method of claim 1, wherein combining the first model and the second model comprises overlapping the first model and the second model using geographic coordinates to assist with alignment.

4. The method of claim 1, wherein the productivity index of the fluid flowing out of the well comprises a volume of the fluid flowing out of the well per unit pressure of drawdown.

5. The method of claim 1, further comprising:
    detecting a problem with the well based at least partially upon the calibrated model; and
    determining an adjustment to an operating parameter in response to the problem, wherein the calibrated model is updated based at least partially upon the adjustment to the operating parameter.

6. The method of claim 5, wherein the problem comprises decreased performance of an artificial lift in the well, and wherein the adjustment to the operating parameter comprises increasing a gas lift injection rate, a gas lift injection pressure, or both.

7. The method of claim 5, wherein the problem comprises wax decomposition in the well or hydrate formation in the well, and wherein the adjustment to the operating parameter comprises introducing a chemical treatment into the well.

8. A non-transitory computer-readable medium storing instructions that, when executed by at least one processor of a computing system, cause the computing system to perform operations, the operations comprising:
    receiving first data, wherein the first data is not real-time data;
    building a first model of a well based at least partially upon the first data;
    receiving second data;
    building a second model comprising a network of flowlines based at least partially upon the second data, wherein at least one of the flowlines is connected to the well;
    combining the first model and the second model to produce a combined model;
    running a simulation of the combined model to produce simulated results;
    calibrating the combined model to produce a calibrated model based at least in part upon the simulated results;
    updating the calibrated model to produce an updated model;
    receiving real-time data; and
    building a machine-learning (ML) model based at least partially upon the real-time data and the updated model via an adaptive learning process comprising weighing one or more model insights and adding one or more failure patterns unrecognizable based on the simulated results, wherein the one or more failure patterns are associated with an electronic submersible pump (ESP) at the well, a gas-oil ratio or a water-to-oil ratio of a fluid flowing out of the well, a well valve, well tubing, well casing, a well pumping module, or any combination thereof; and generating, via the ML model, a proactive solution in response to predicting one or more potential problems based on one or more data patterns recognized in the real-time data and the one or more failure patterns, wherein the data patterns comprise at least ESP motor temperature, intake pressure, outlet pressure, and motor current amperage (amps), wherein the ML model is configured to provide a probability or confidence of the one or more potential problems or the one or more model insights, and wherein the proactive solution comprises a remedial plan to solve the one or more potential problems.

9. The non-transitory computer-readable medium of claim 8, wherein the operations further comprise:

detecting a first problem using the ML model based upon the one of more potential problems, wherein the first problem is based at least partially upon the real-time data;

detecting a second problem using the ML model based upon the one of more potential problems, wherein the second problem is based at least partially upon the updated model; and detecting a third problem using the ML model based upon the one of more potential problems, wherein the third problem is based at least partially upon a pre-defined rule.

10. The non-transitory computer-readable medium of claim 9, wherein the operations further comprise:

ranking the first problem, the second problem, and the third problem using the ML model; and identifying a highest-ranking one of the first problem, the second problem, and the third problem.

11. The non-transitory computer-readable medium of claim 10, wherein the operations further comprise determining an adjustment to an operating parameter to address the highest-ranking one of the first problem, the second problem, and the third problem.

12. The non-transitory computer-readable medium of claim 11, wherein the operations further comprise updating the ML model based at least partially upon the adjustment to the operating parameter to produce an updated ML model.

13. The non-transitory computer-readable medium of claim 8, wherein the real-time data comprises a flow rate of the fluid flowing out of the well, one or more phases of the fluid, a pressure of the fluid, a temperature of the fluid, or a combination thereof.

14. The non-transitory computer-readable medium of claim 8, wherein the updated model comprises a physical representation of a well, and wherein the ML model does not comprise a physical representation.

15. A computing system comprising:
one or more processors; and
a memory system comprising one or more non-transitory computer-readable media storing instructions that, when executed by at least one of the one or more processors, cause the computing system to perform operations, the operations comprising:
receiving first data;
building a first model of a well based at least partially upon the first data;
receiving second data;
building a second model comprising a network of flowlines based at least partially upon the second data;
combining the first model and the second model to produce a combined model;
running a simulation of the combined model to produce simulated results;
calibrating the combined model to produce a calibrated model based at least in part upon the simulated results;
updating the calibrated model to produce an updated model;
receiving real-time data;
building a machine-learning (ML) model based at least partially upon the real-time data and the updated model via an adaptive learning process comprising weighing one or more model insights and adding one or more failure patterns unrecognizable based on the simulated results, wherein the one or more failure patterns are associated with an electronic submersible pump (ESP) at the well, a gas-oil ratio or a water-to-oil ratio of a fluid flowing out of the well, a well valve, well tubing, well casing, a well pumping module, or any combination thereof; and
generating, via the ML model, a proactive solution in response to predicting one or more potential problems based on one or more data patterns recognized in the real-time data and the one or more failure patterns, wherein the data patterns comprise at least ESP motor temperature, intake pressure, outlet pressure, and motor current amperage (amps), wherein the ML model is configured to provide a probability or confidence of the one or more potential problems or the one or more model insights, and wherein the proactive solution comprises a remedial plan to solve the one or more potential problems;
detecting a first problem using the ML model based upon the one of more potential problems, wherein the first problem is based at least partially upon the real-time data;
detecting a second problem using the ML model based upon the one of more potential problems, wherein the second problem is based at least partially upon the updated model;
detecting a third problem using the ML model based upon the one of more potential problems, wherein the third problem is based at least partially upon a pre-defined rule;
ranking the first problem, the second problem, and the third problem using the ML model;
identifying a highest-ranking one of the first problem, the second problem, and the third problem; and
determining an adjustment to an operating parameter to address the highest-ranking one of the first problem, the second problem, and the third problem.

16. The system of claim 15, wherein the first data comprises completion data for the well, survey data for the well, fluid data for the well, or a combination thereof, wherein the second data comprises vector features of a wellsite including the well, and wherein the real-time data comprises a flow rate of the fluid flowing out of the well, one or more phases of the fluid, a pressure of the fluid, a temperature of the fluid, or a combination thereof.

17. The system of claim 15, wherein the highest-ranking one of the first problem, the second problem, and the third problem comprises decreased performance of an artificial lift in the well, and wherein the adjustment to the operating parameter comprises increasing a gas lift injection rate, a gas lift injection pressure, or both.

18. The system of claim 15, wherein the highest-ranking one of the first problem, the second problem, and the third problem comprises wax decomposition in the well or hydrate formation in the well, and wherein the adjustment to the operating parameter comprises introducing a chemical treatment into the well.

19. The system of claim 15, wherein the highest-ranking one of the first problem, the second problem, and the third problem comprises a drawdown that is greater than a predetermined threshold, and wherein the adjustment to the operating parameter comprises reducing a size of a choke in the well.

20. The system of claim 15, wherein the operations further comprise updating the ML model based at least partially upon an adjustment to the operating parameter to produce an updated ML model.

\* \* \* \* \*